United States Patent
Nakano et al.

(10) Patent No.: US 9,882,437 B2
(45) Date of Patent: Jan. 30, 2018

(54) POWER FEEDING APPARATUS, POWER RECEIVING APPARATUS, POWER FEEDING SYSTEM, AND METHOD OF CONTROLLING POWER FEEDING

(71) Applicant: Sony Corporation, Tokyo (JP)

(72) Inventors: Hiroaki Nakano, Kanagawa (JP); Toru Terashima, Kanagawa (JP); Keigo Bunsen, Kanagawa (JP); Osamu Kozakai, Kanagawa (JP); Kenichi Fujimaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/088,077

(22) Filed: Mar. 31, 2016

(65) Prior Publication Data
US 2016/0248279 A1 Aug. 25, 2016
US 2018/0006503 A9 Jan. 4, 2018

Related U.S. Application Data

(63) Continuation of application No. 14/895,174, filed as application No. PCT/JP2014/004217 on Aug. 19, 2014.

(30) Foreign Application Priority Data

Aug. 28, 2013 (JP) ................................ 2013-176235

(51) Int. Cl.
*H02J 50/60* (2016.01)
*H04L 25/03* (2006.01)
(Continued)

(52) U.S. Cl.
CPC .............. *H02J 50/60* (2016.02); *H02J 50/12* (2016.02); *H02J 50/80* (2016.02); *H04L 25/028* (2013.01);
(Continued)

(58) Field of Classification Search
CPC ............. H02J 5/005; H02J 7/025; H02J 17/00
See application file for complete search history.

(56) References Cited

U.S. PATENT DOCUMENTS

2007/0216390 A1   9/2007  Wai
2007/0228833 A1*  10/2007  Stevens ................... H02J 5/005
                                              307/45
(Continued)

FOREIGN PATENT DOCUMENTS

EP     2 590 300 A1     5/2013
JP     2010-011588 A    1/2010
(Continued)

OTHER PUBLICATIONS

International Search Report and Written Opinion prepared by the European Patent Office dated Nov. 21, 2014, for International Application No. PCT/JP2014/004217.
(Continued)

*Primary Examiner* — Rexford Barnie
*Assistant Examiner* — David Shiao
(74) *Attorney, Agent, or Firm* — Michael Best & Friedrich LLP

(57) ABSTRACT

A power feeding apparatus is provided. The power feeding apparatus includes a power feeding unit configured to supply electric power to a power receiving apparatus through a magnetic field; a measuring unit configured to measure an electric characteristic value and to generate a measurement value; a power receiving unit configured to provide a set value; and a foreign substance detection unit configured to detect a foreign substance in the magnetic field based on the set value and the measurement value. A power receiving apparatus, a power feeding system, and a method of controlling power feeding are also provided.

19 Claims, 24 Drawing Sheets

(51) Int. Cl.
    *H02J 50/80*        (2016.01)
    *H02J 50/12*        (2016.01)
    *H04L 25/02*        (2006.01)
    *H04L 25/49*        (2006.01)

(52) U.S. Cl.
    CPC .. *H04L 25/03343* (2013.01); *H04L 25/03878* (2013.01); *H04L 25/0272* (2013.01); *H04L 25/4917* (2013.01)

(56) References Cited

U.S. PATENT DOCUMENTS

| | | |
|---|---|---|
| 2009/0322280 A1 | 12/2009 | Takahiro et al. |
| 2011/0196544 A1* | 8/2011 | Baarman ............... H01F 38/14 700/291 |
| 2012/0001493 A1 | 1/2012 | Hiroki et al. |
| 2012/0119576 A1* | 5/2012 | Kesler ................... B60L 11/182 307/10.1 |
| 2012/0175967 A1* | 7/2012 | Dibben .................. H02J 5/005 307/104 |
| 2012/0322280 A1 | 12/2012 | Fuma et al. |
| 2013/0027078 A1 | 1/2013 | Nakano |
| 2013/0076153 A1 | 3/2013 | Murayama |
| 2013/0094598 A1* | 4/2013 | Bastami ................. H02J 5/005 375/259 |
| 2013/0162054 A1 | 6/2013 | Komiyama |
| 2013/0241300 A1 | 9/2013 | Miyamoto |
| 2014/0084857 A1* | 3/2014 | Liu ......................... H02J 7/025 320/108 |
| 2014/0125287 A1* | 5/2014 | Nakano ................. H02J 5/005 320/128 |
| 2015/0035376 A1 | 2/2015 | Baarman |
| 2016/0141882 A1 | 5/2016 | Ichikawa |

FOREIGN PATENT DOCUMENTS

| | | | |
|---|---|---|---|
| JP | 2011-030422 | 2/2011 | |
| JP | 5071574 | 8/2012 | |
| JP | 2012-244732 A | 12/2012 | |
| JP | 2013-027255 A | 2/2013 | |
| WO | WO 2013005860 A1 * | 1/2013 | ............. H02J 5/005 |
| WO | WO-2013/035853 A1 | 3/2013 | |

OTHER PUBLICATIONS

Japanese Office Action dated Oct. 18, 2016 for corresponding Japanese Application No. 2013-176235.
Japanese Office Action dated Jul. 11, 2017 for corresponding Japanese Application No. 2017-007691 / 2013-176235.
Extended European Search Report dated Sep. 27, 2017 for corresponding European Application No. 17178596.7.

* cited by examiner

[Fig. 1]
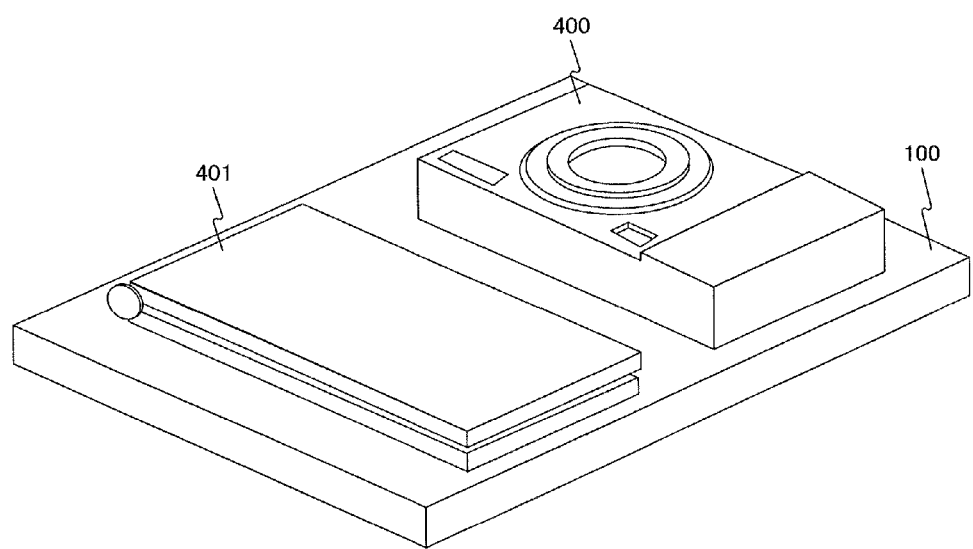

[Fig. 2]
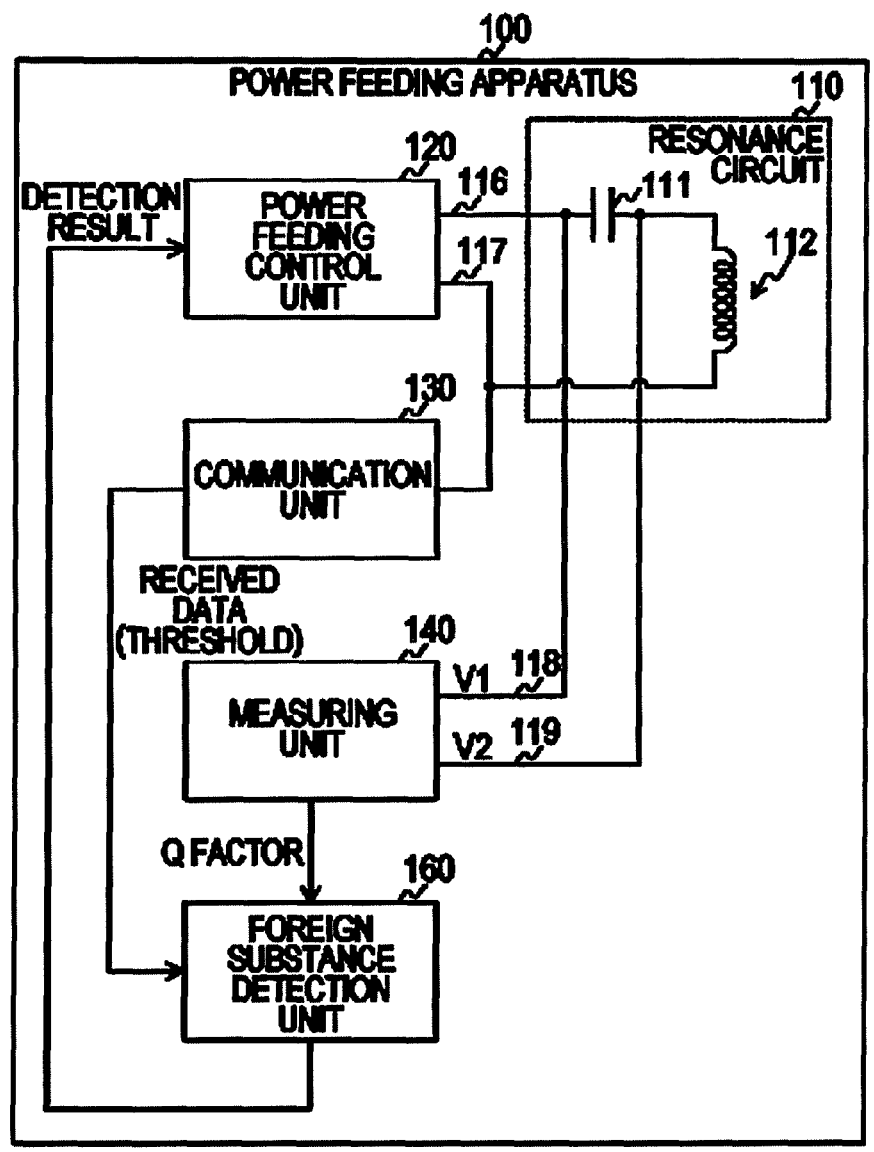

[Fig. 3]
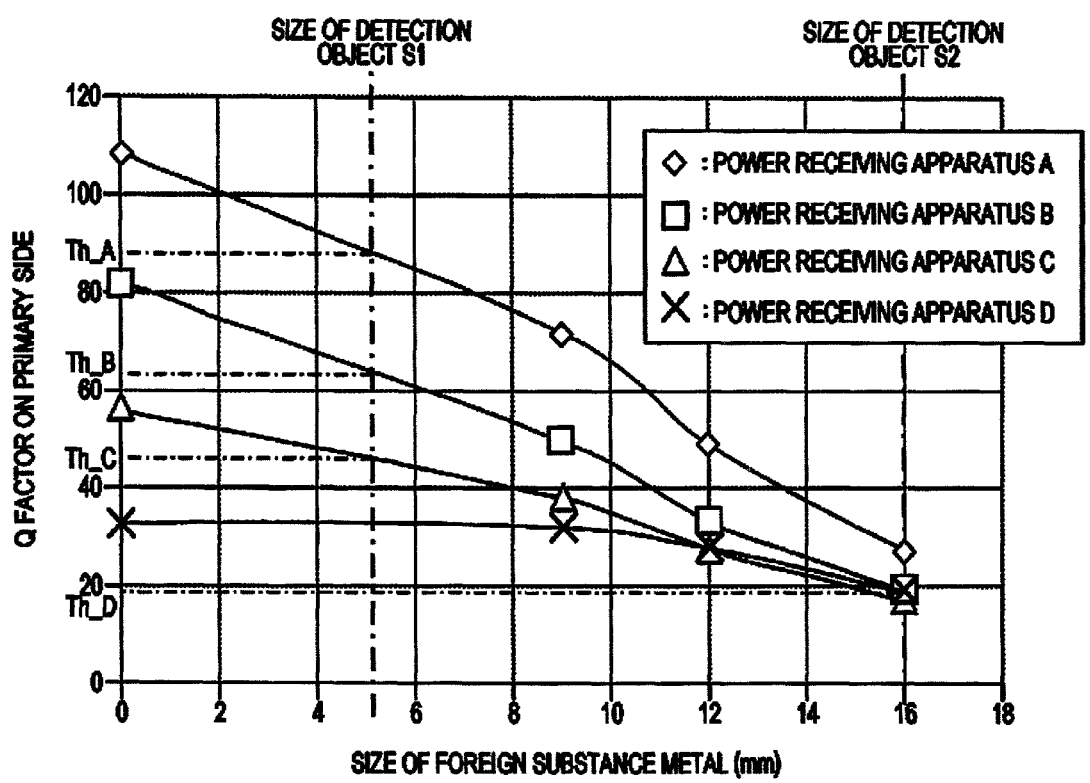

[Fig. 4]
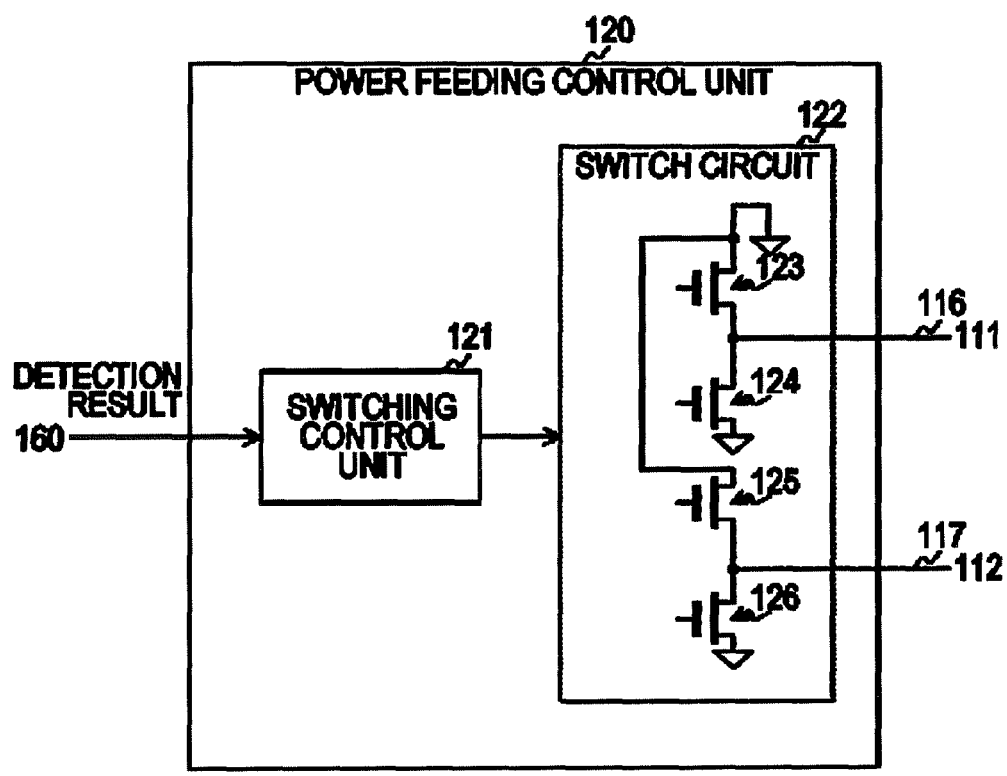

[Fig. 5]
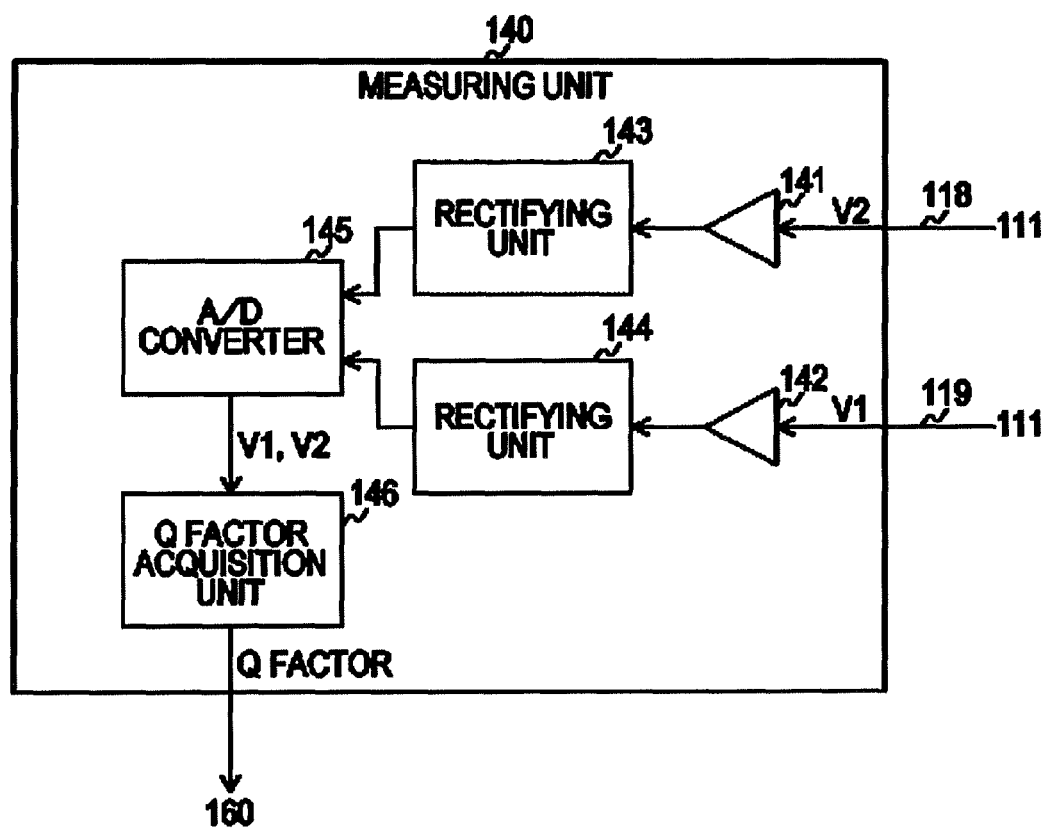

[Fig. 6]
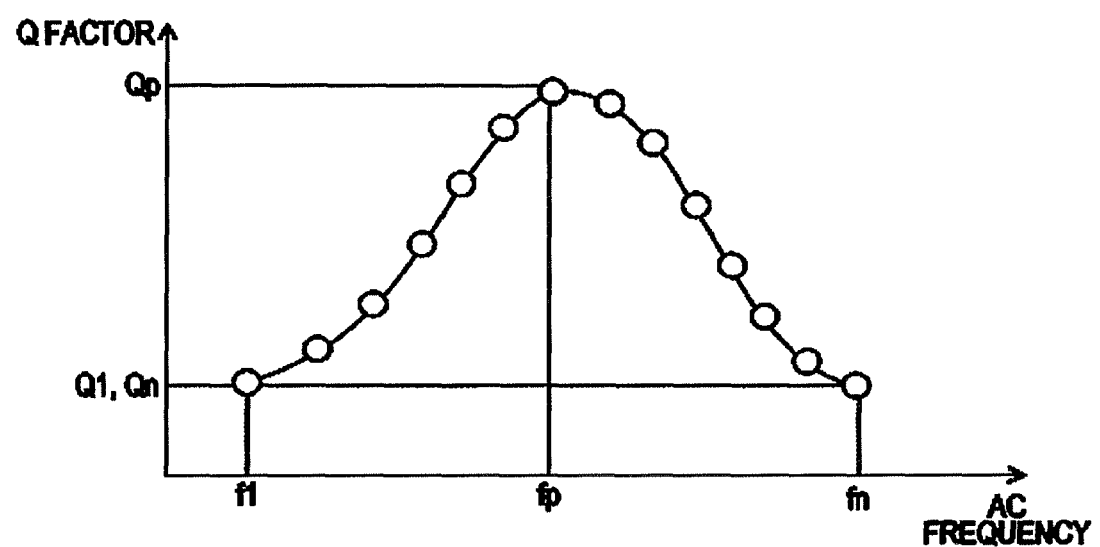

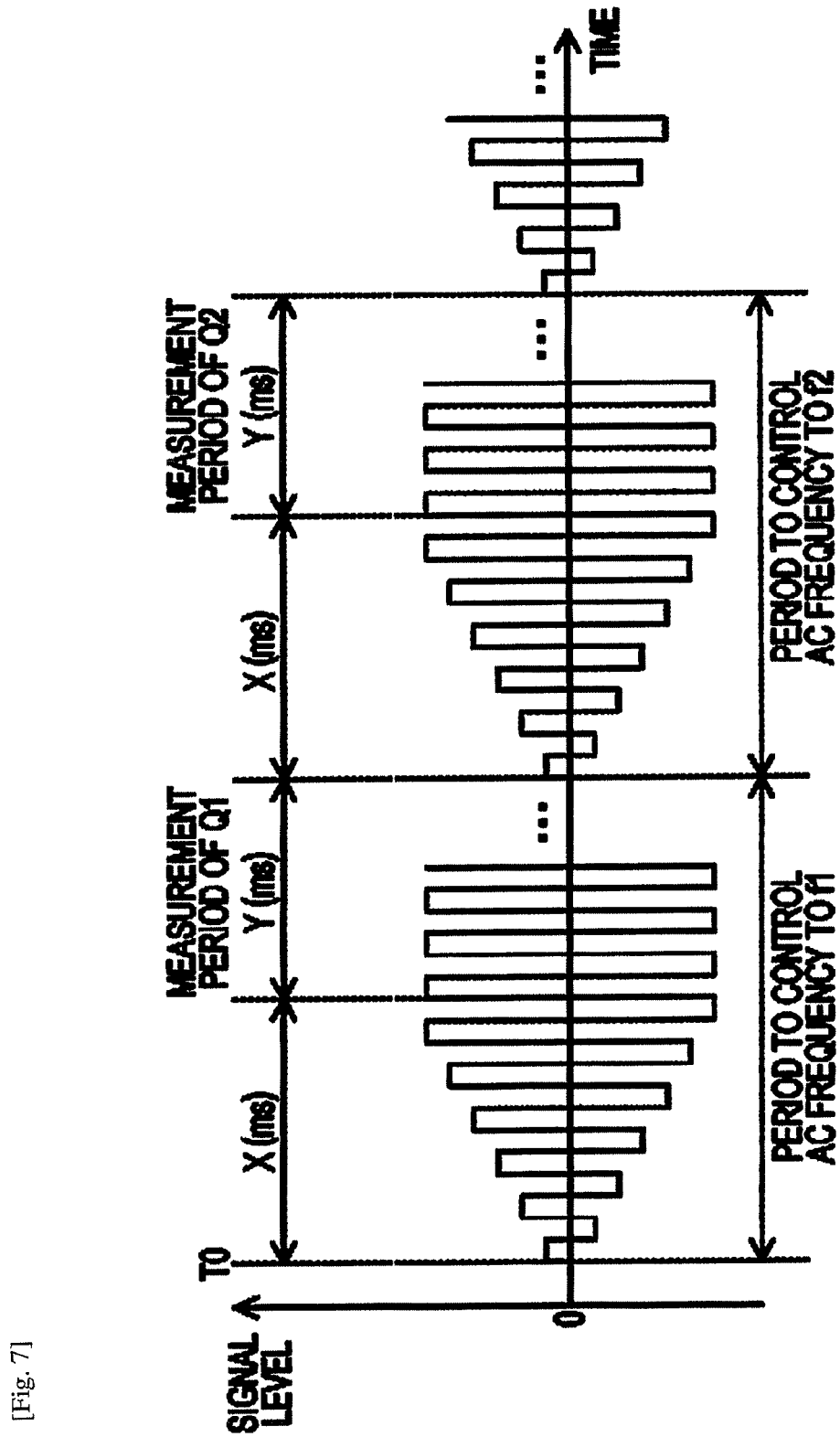
[Fig. 7]

[Fig. 8]
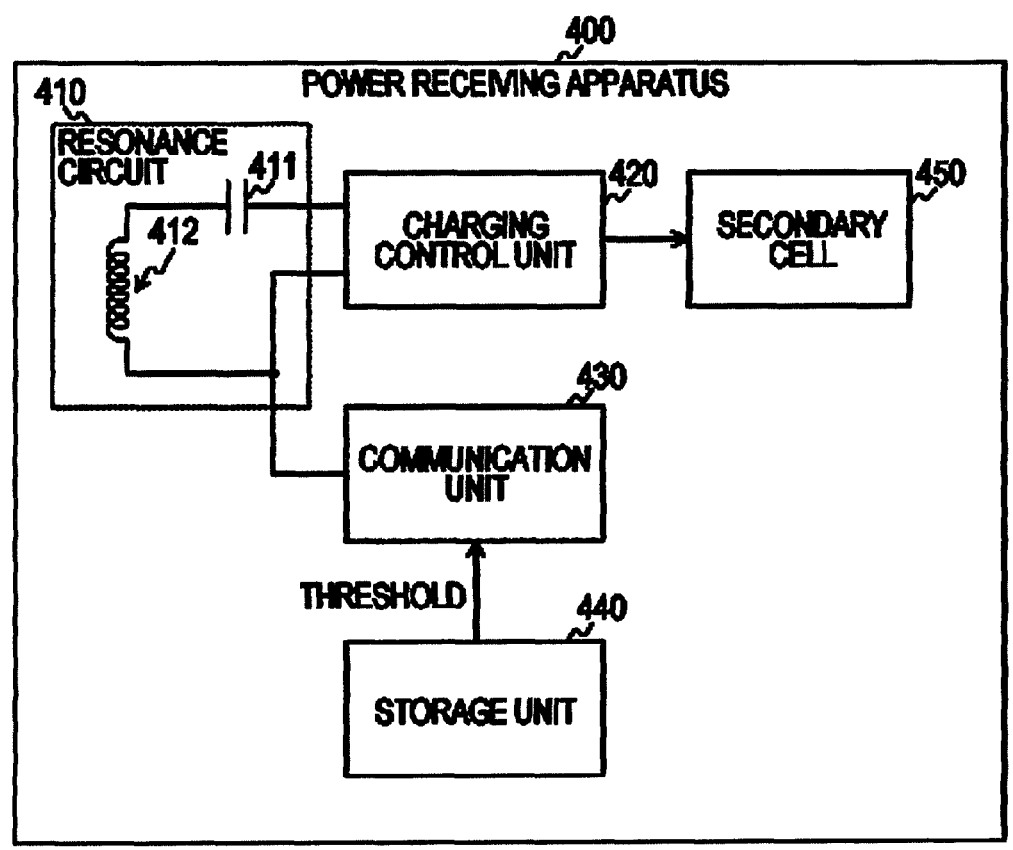

[Fig. 9]
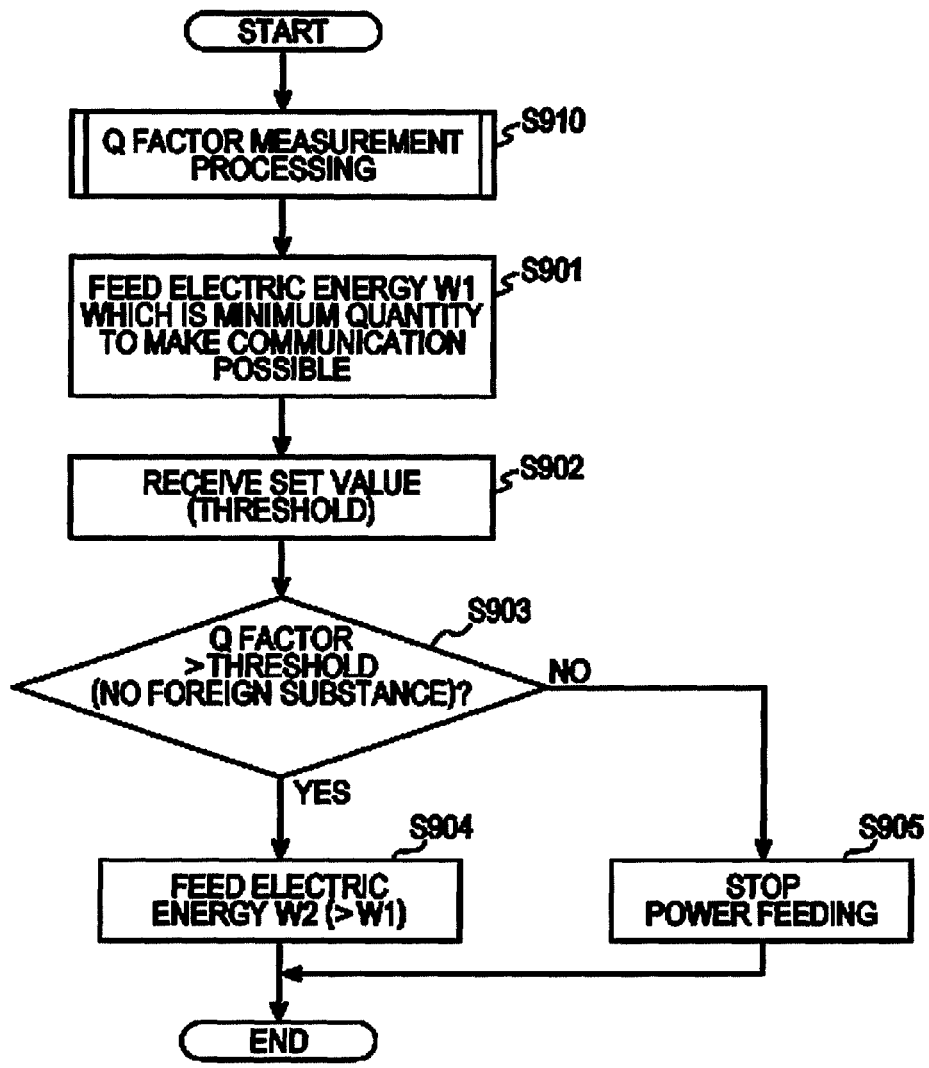

[Fig. 10]
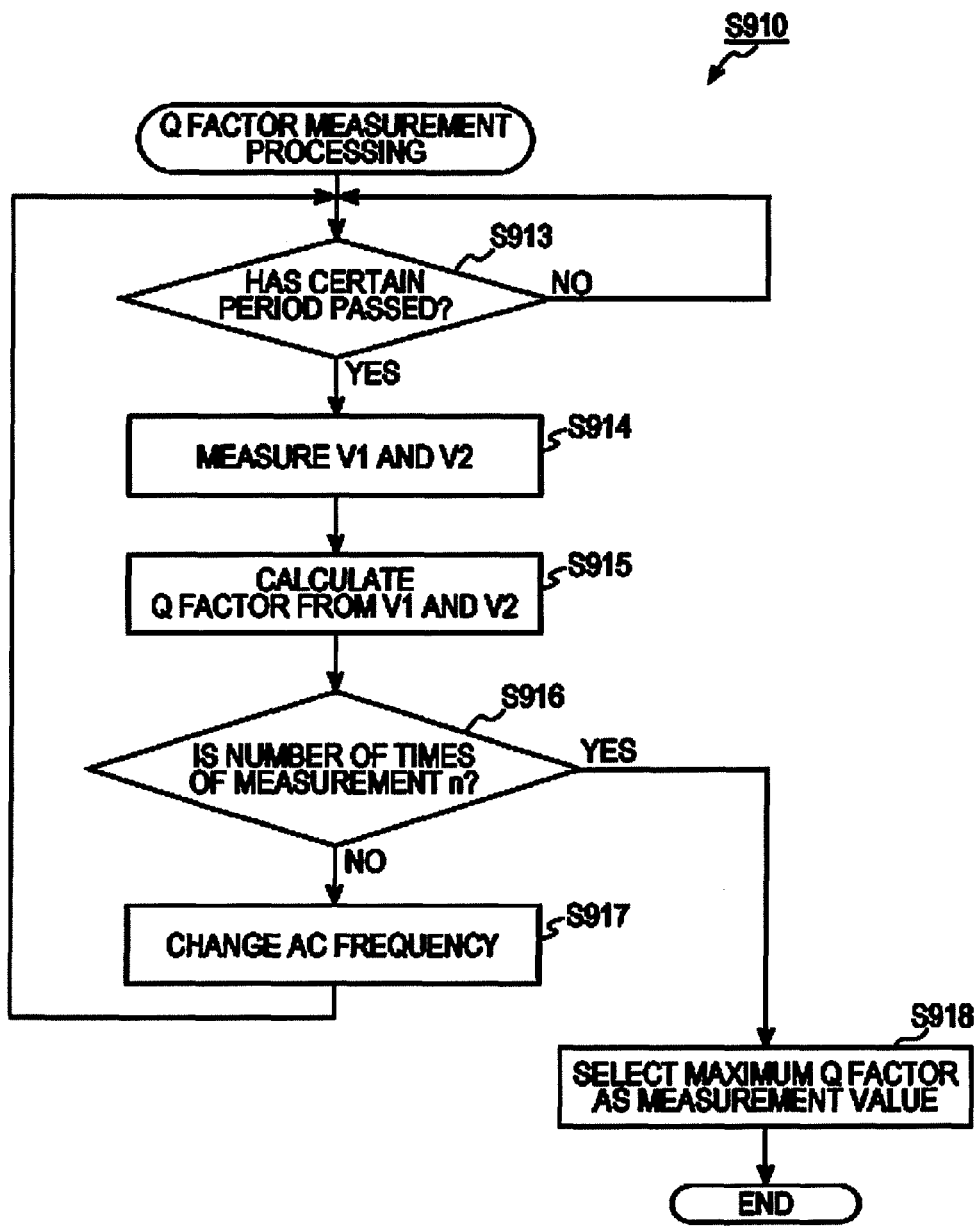

[Fig. 11]
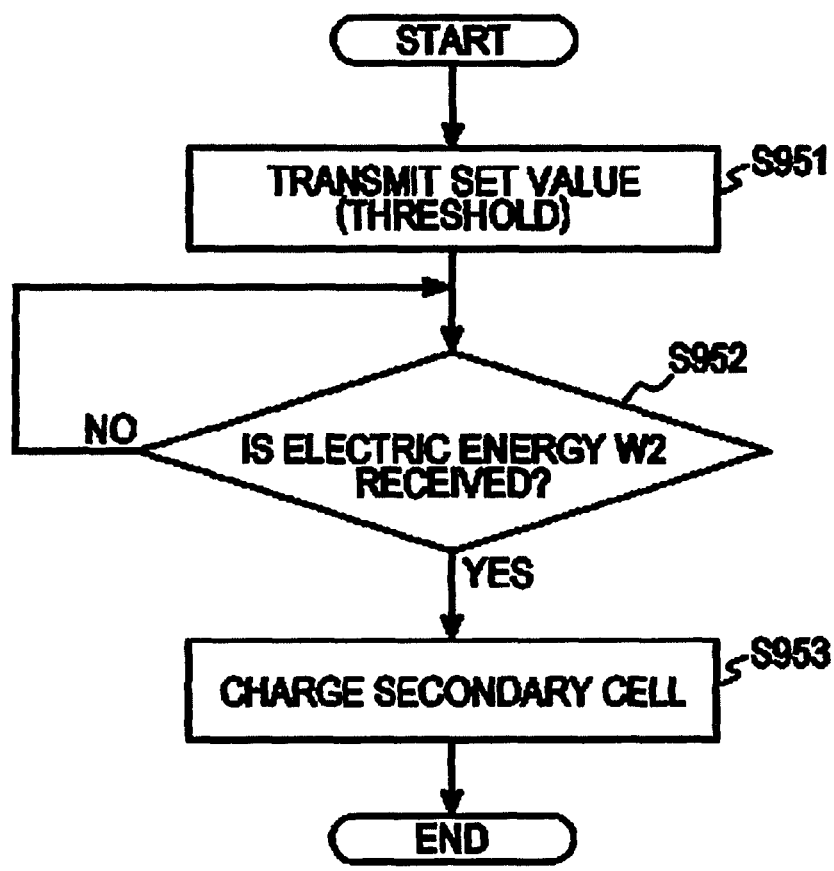

[Fig. 12]
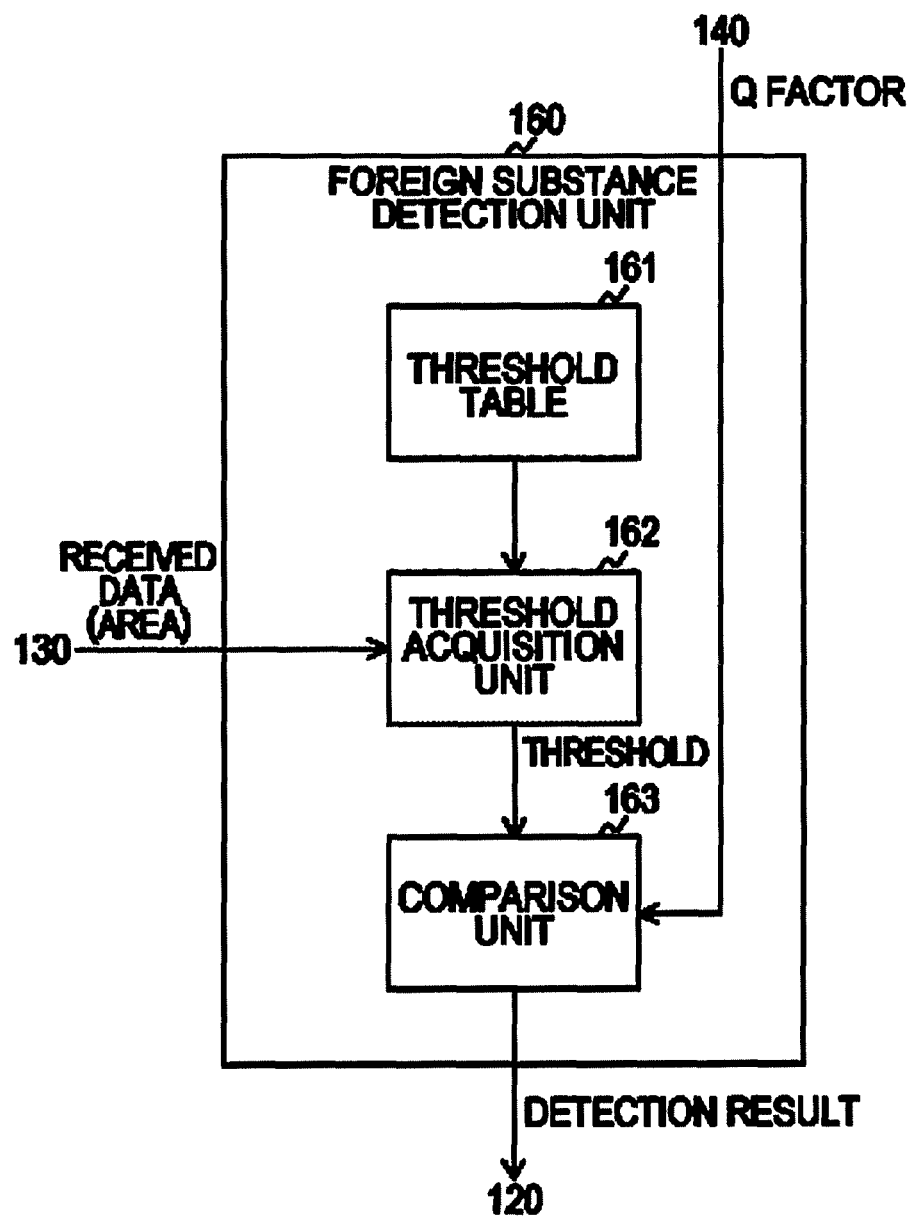

[Fig. 13]
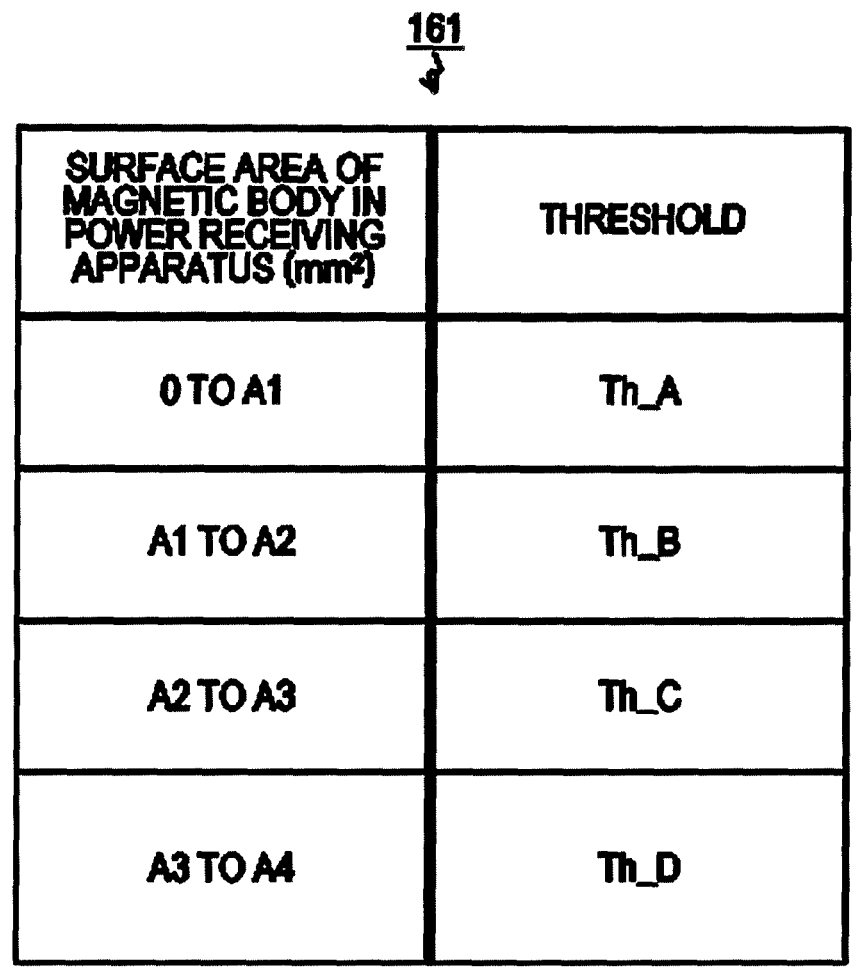

[Fig. 14]
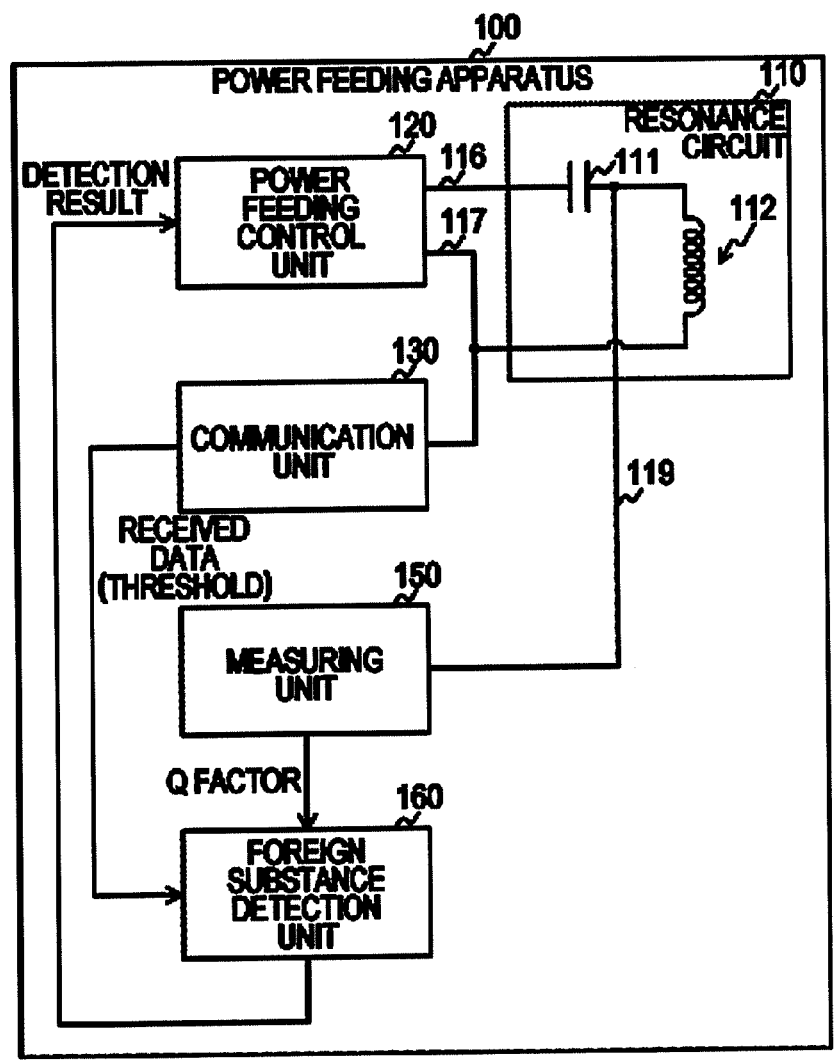

[Fig. 15]
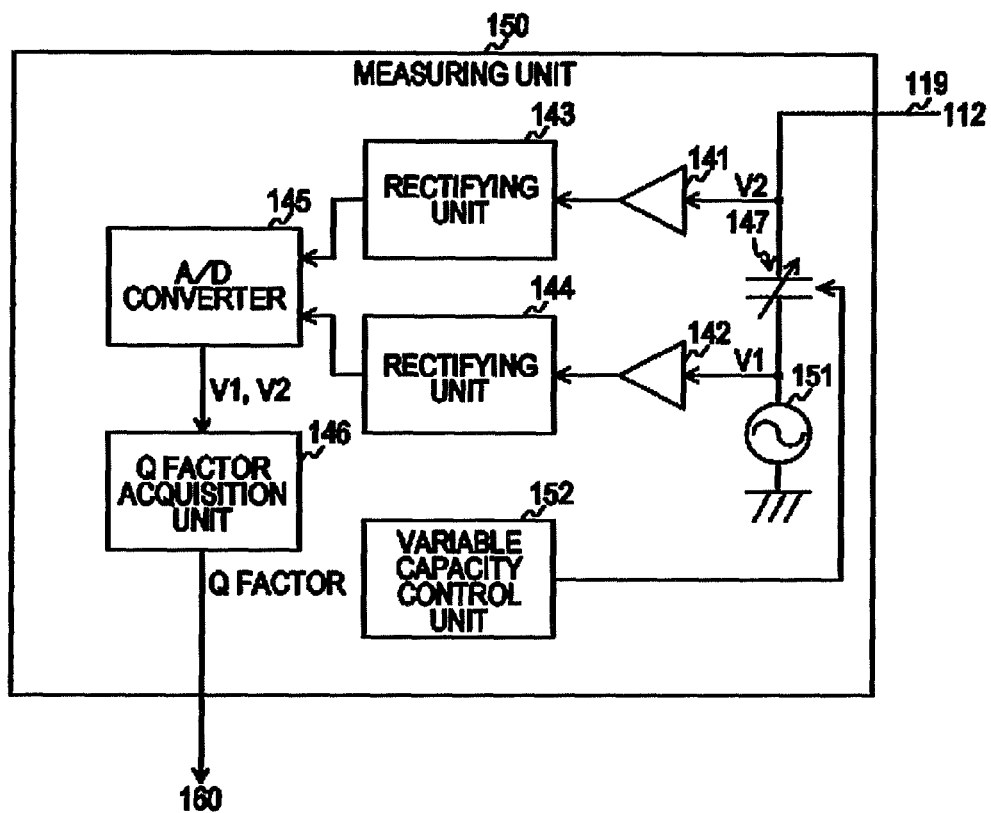

[Fig. 16]
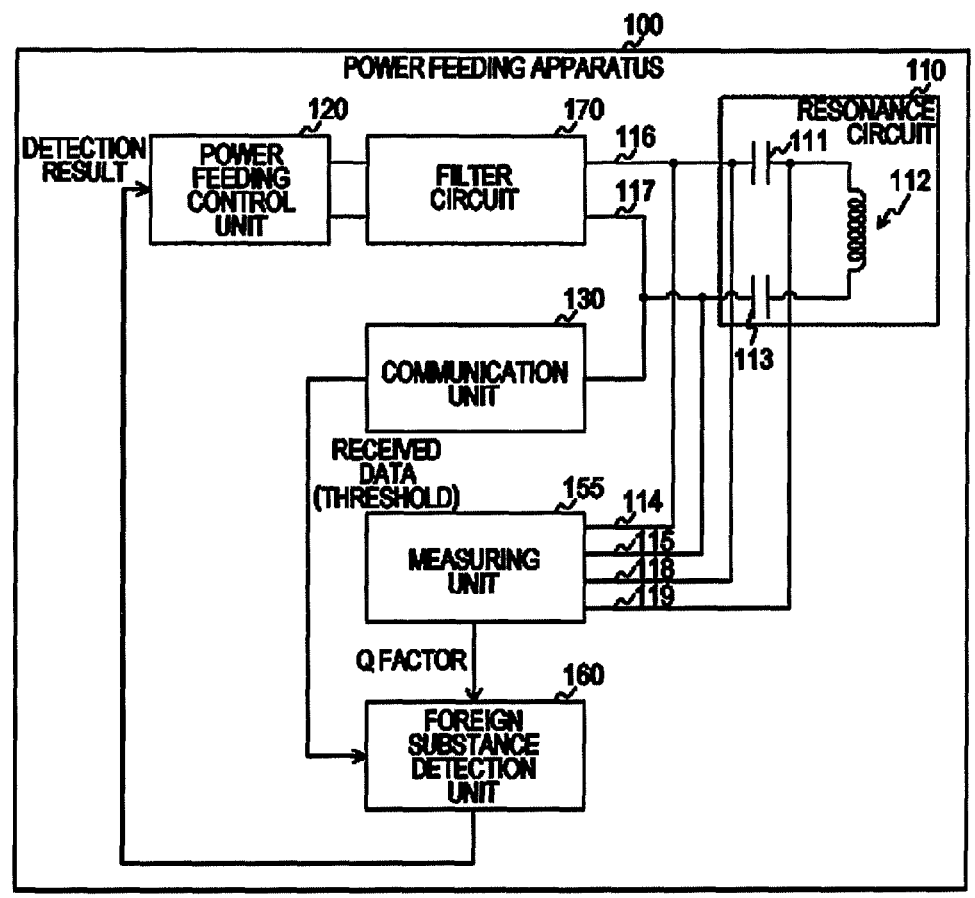

[Fig. 17]
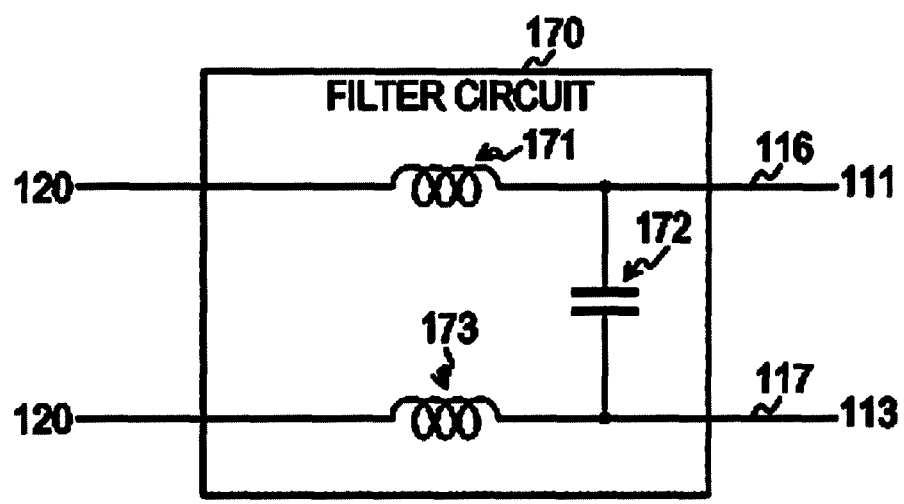

[Fig. 18]
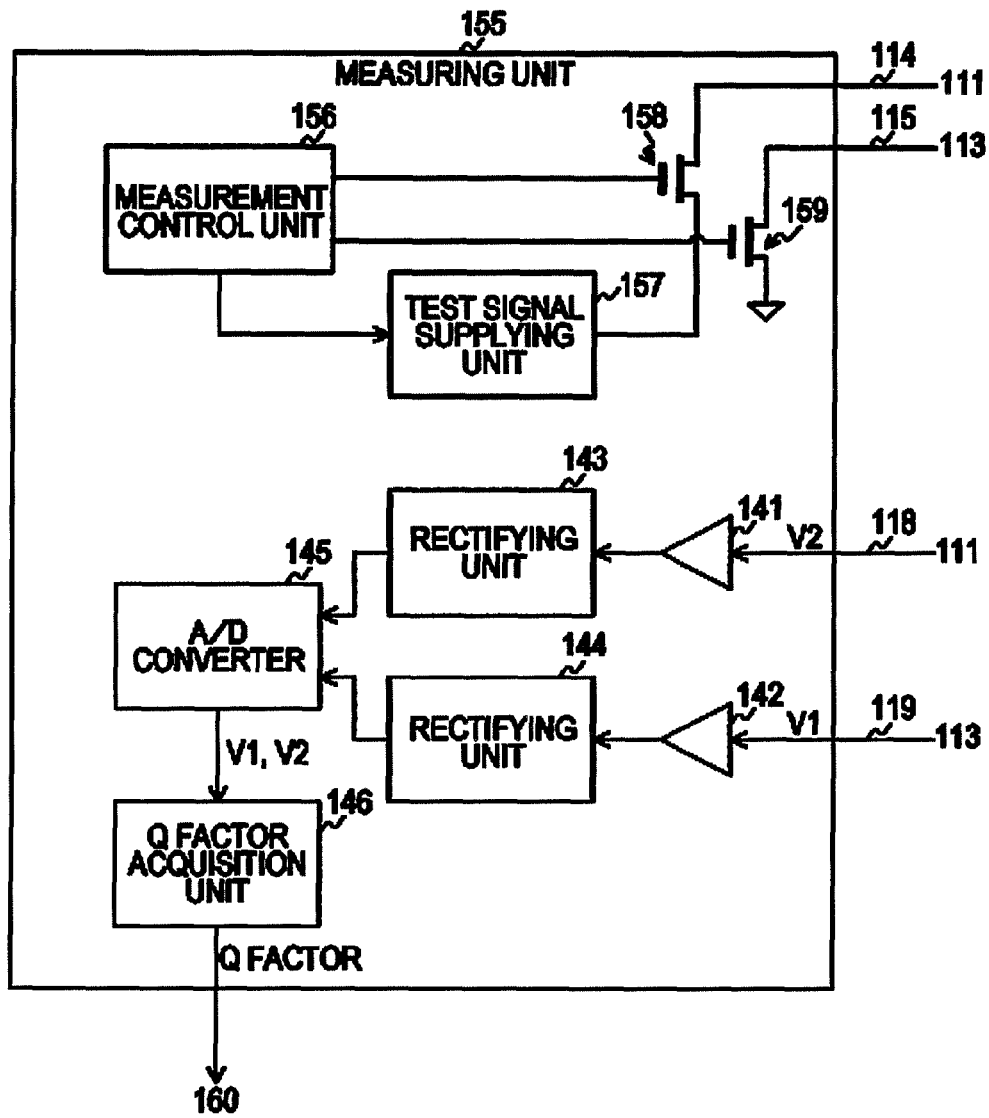

[Fig. 19]
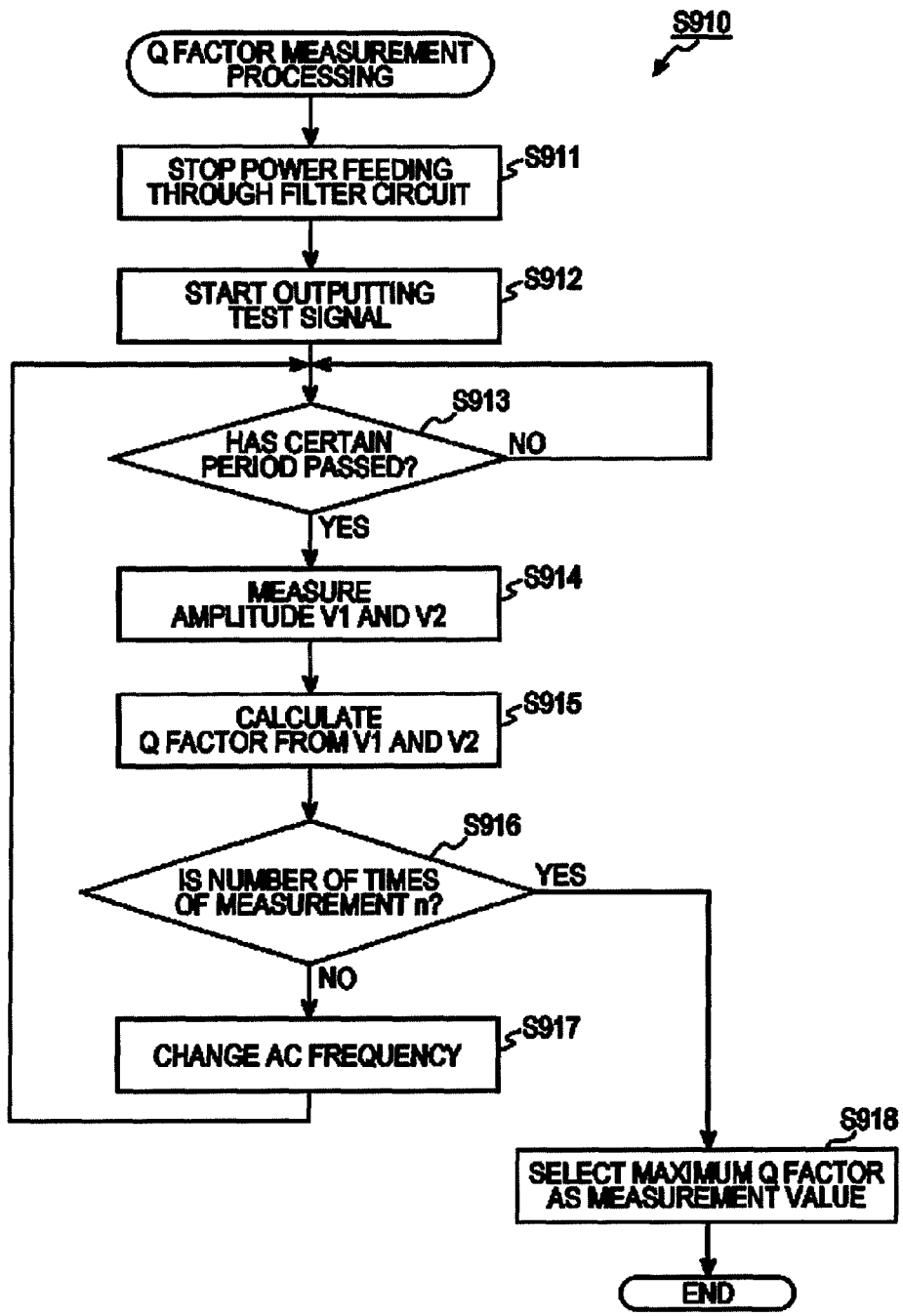

[Fig. 20]
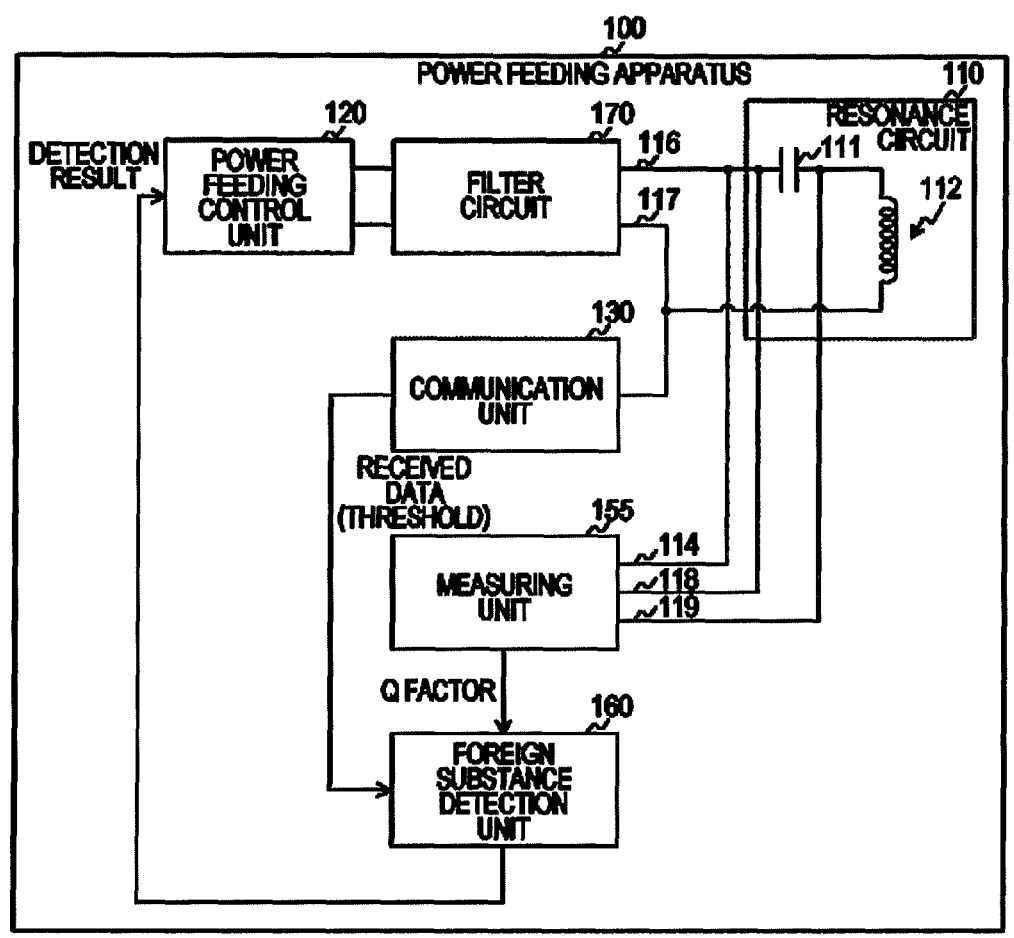

[Fig. 21]
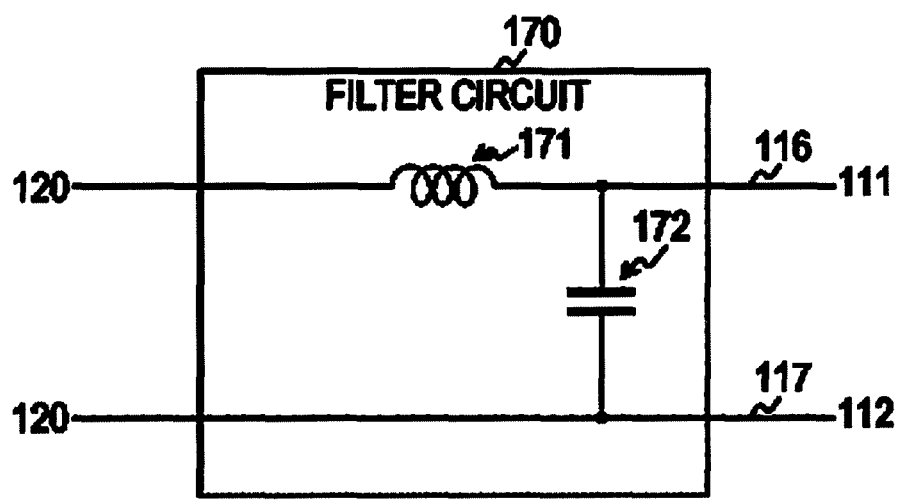

[Fig. 22]
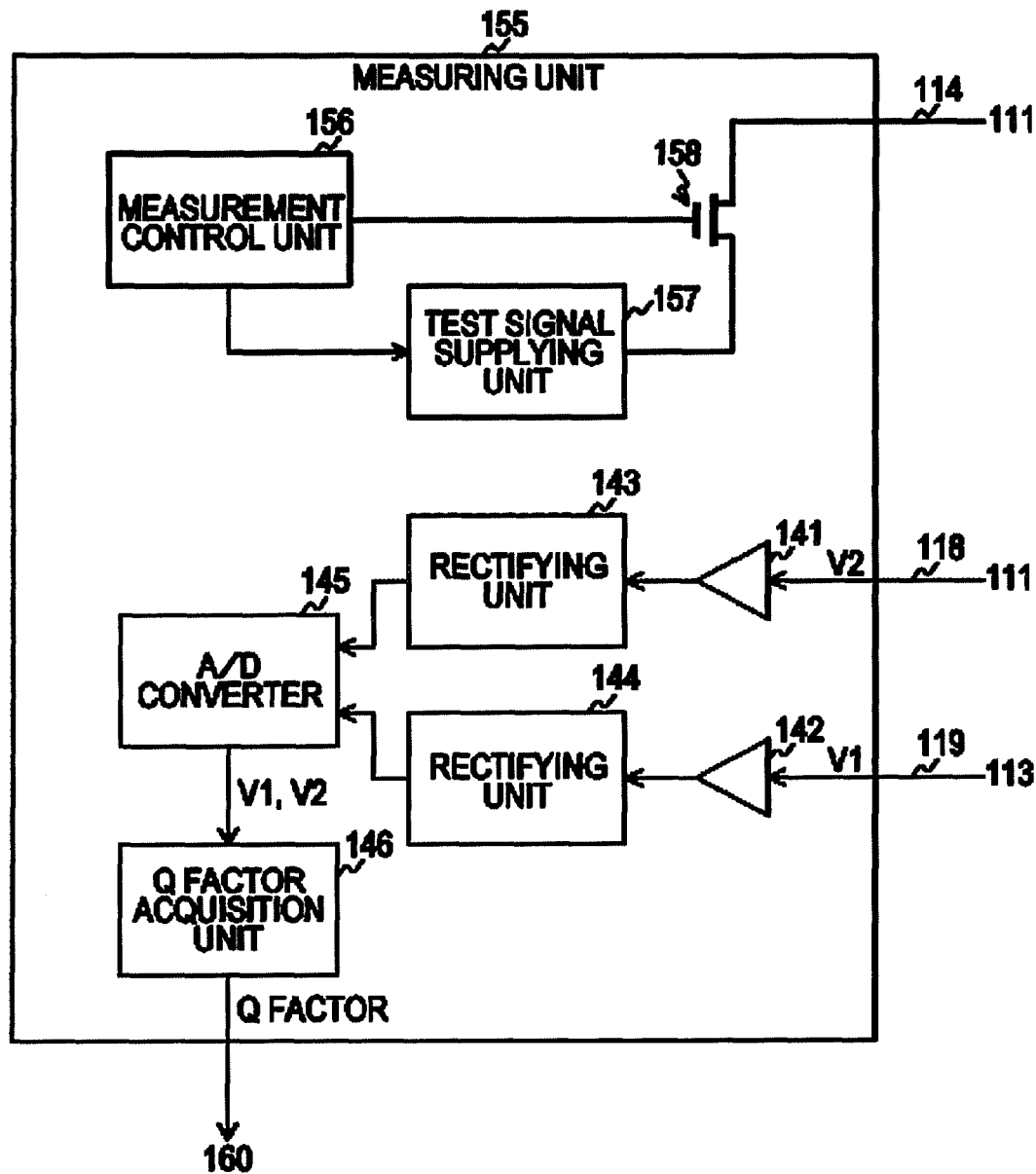

[Fig. 23]
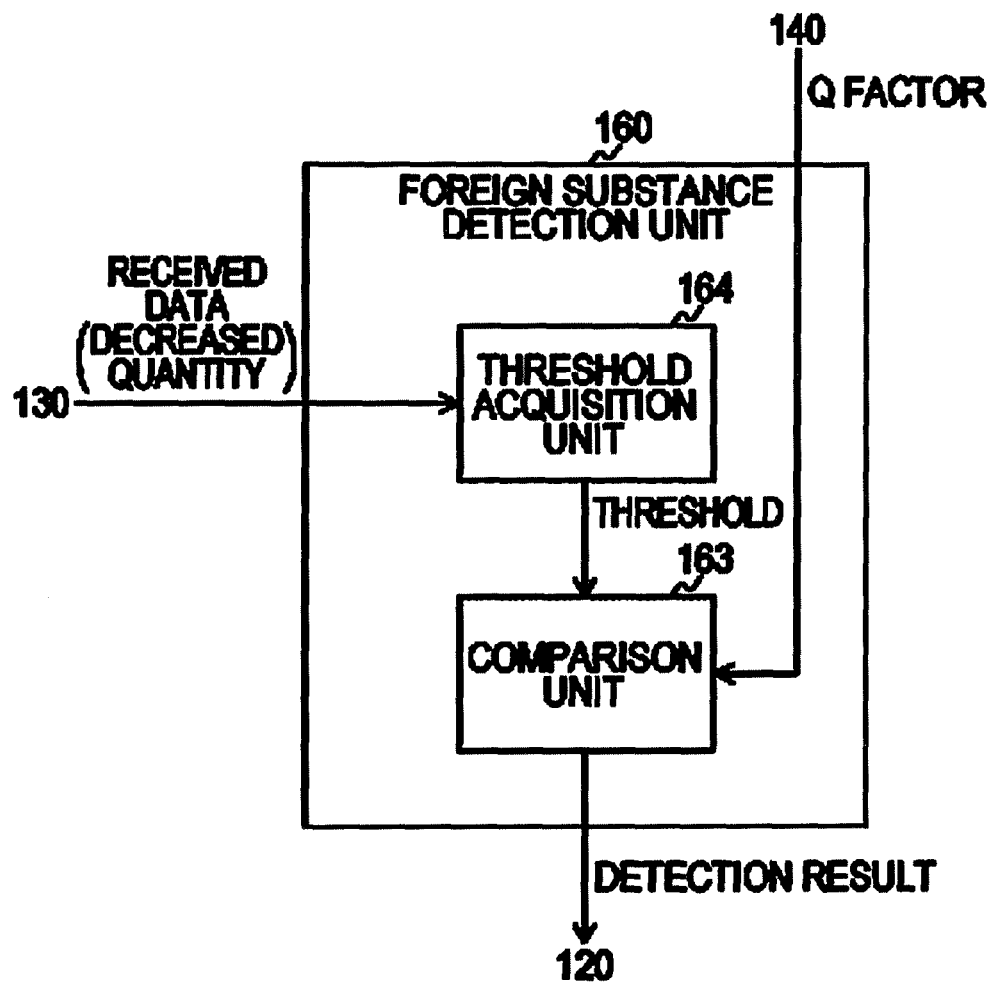

[Fig. 24]
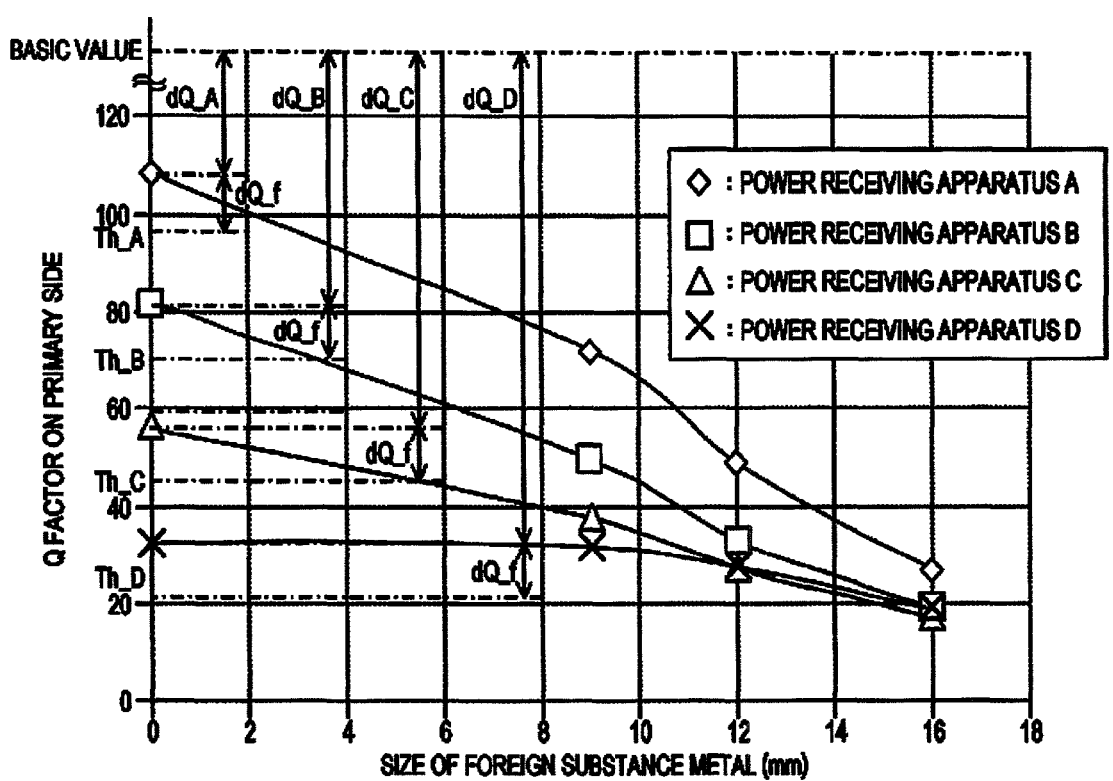

POWER FEEDING APPARATUS, POWER RECEIVING APPARATUS, POWER FEEDING SYSTEM, AND METHOD OF CONTROLLING POWER FEEDING

CROSS REFERENCE TO RELATED APPLICATIONS

This is a Continuation Application of patent application Ser. No. 14/895,174, filed Dec. 1, 2015, which claims priority from National Stage Application No.: PCT/JP2014/004217, filed Aug. 19, 2014 and Japanese Patent Application No.: 2013-176235, filed Aug. 28, 2013. The entire contents of these applications are incorporated herein by reference.

TECHNICAL FIELD

The present technique relates to a power feeding apparatus, a power receiving apparatus, a power feeding system, and a method of controlling power feeding. Specifically, the present technique relates to a power feeding apparatus a power receiving apparatus, a power feeding system, and a method of controlling power feeding, which are to detect a foreign substance in a magnetic field.

BACKGROUND ART

Recently, a system to supply electric power wirelessly has been widely considered. There are two major systems to realize wireless power feeding. One of these systems is an electromagnetic induction system which has been widely known. In the electromagnetic induction system, a degree of coupling between a power transmitting side and a power receiving side is very high and power feeding can be performed at high efficiency. The other system is a magnetic field resonance system. In the magnetic field resonance system, by using a resonance phenomenon positively, it is not necessary for a power feeding source and a power fed destination to share much magnetic flux. There is a common problem between these two systems, which is a safety problem due to heat generated by a foreign substance. Each of these systems uses a magnetic field for power feeding, whereby when a foreign substance of a conductor (such as metal) enters into the magnetic field, an eddy current may flow through the foreign substance and the foreign substance may generate heat.

Thus, a method to detect whether there is a foreign substance from change in an electric characteristic value of an apparatus has been proposed. With such a method, a design restriction or the like is not necessary, and thus, it is possible to detect a foreign substance at a low cost. Specifically, a power feeding system to measure power difference between transmitted power and received power as an electric characteristic value, and to detect a foreign substance from change in the power difference, has been proposed (see, for example Patent Literature 1). Also, a power feeding system to detect a foreign substance by measuring a quality factor, so-called a Q factor, as an electric characteristic value and by comparing the measured Q factor and a threshold (see, for example, Patent Literature 2).

CITATION LIST

Patent Literature

PTL 1: JP 2011-30422 A
PTL 2: JP 5071574 B1

SUMMARY

Technical Problem

However, in the related technique, it may not possible to detect a foreign substance in a magnetic field accurately. In the power feeding system, in a magnetic field, there is not only a conductor included in a foreign substance but also a conductor included in a power receiving apparatus. An electric characteristic value such as a Q factor may also be fluctuated according to the quantity of conductors in the power receiving apparatus. Thus, it is necessary to set a threshold to be compared with an electric characteristic value, with consideration of the quantity of conductors in a power receiving apparatus. However, the quantity of conductors often differs according to the kind of power receiving apparatus. Therefore, in a case where it is assumed to feed power to a plurality of kinds of power receiving apparatuses, it becomes difficult to set an appropriate threshold. Thus, the power feeding system may not be able to detect a foreign substance in the magnetic field accurately from change in an electric characteristic value.

In the view of forgoing, the present technique has been made to detect a foreign substance in a magnetic field accurately.

Solution to Problem

According to an embodiment of the present technique, a first aspect thereof is a power feeding apparatus and a control method thereof, the power feeding apparatus including: a power feeding unit configured to supply electric power to a power receiving apparatus through a magnetic field; a measuring unit configured to measure an electric characteristic value of the power feeding unit and to generate a measurement value; a receiving unit configured to receive a set value which is set in the power receiving apparatus; and a foreign substance detection unit configured to detect a foreign substance in the magnetic field based on the set value and the measurement value. With this, a foreign substance in a magnetic field is detected based on a set value set in a power receiving apparatus and a measurement value.

Also, in the first aspect, the set value may be set based on a quantity of conductors included in the power receiving apparatus. With this, a foreign substance in a magnetic field is detected based on a set value, which is set based on a quantity of conductors included in a power receiving apparatus, and a measurement value.

Also, in the first aspect, the set value may be a threshold used for detection of the foreign substance, and the foreign substance detection unit may compare the threshold and the measurement value and detect the foreign substance based on the comparison result. With this, a foreign substance is detected based on a comparison result between a threshold and a measurement value.

Also, in the first aspect, the set value may be a variation of the electric characteristic value changed due to an arrangement of the power receiving apparatus in the magnetic field. With this, a foreign substance is detected based on a variation and a measurement value.

Also, in the first aspect, the set value may be surface area of the conductor. With this, a foreign substance is detected based on a surface area and a measurement value.

Also, in the first aspect, the power feeding unit further may supply a plurality of AC signals having different frequencies serially as test signals through the magnetic field, and the measuring unit may measure the electric characteristic value at each time any of the plurality of test signals is supplied and supply, to the foreign substance detection unit, a statistic of the measured electric characteristic value as the measurement value. With this, a statistic of electric characteristic value, which is measured at each time any of a plurality of test signals is supplied, is supplied as a measurement value.

Also, in the first aspect, the measuring unit may serially supply, as test signals, a plurality of AC signals having different frequencies through the magnetic field, and may supply, as the measurement value, a statistic of the electric characteristic value, which is measured at each time each of the test signals is supplied, to the foreign substance detection unit. With this, a statistic of electric characteristic value, which is measured in each time a plurality of test signals is supplied, is supplied as a measurement value.

Also, in the first aspect, the power feeding unit may include a power feeding coil configured to supply the electric power through the magnetic field, and the measuring unit may include a variable capacity connected to the power feeding coil, an AC power source configured to supply, as a test signal, the AC signal having a predetermined frequency to the power feeding unit through the variable capacity, a variable capacity control unit configured to change a frequency of the test signal by changing capacity of the variable capacity for a predetermined number of times, a measurement value supplying unit configured to measure the electric characteristic value at each time the capacity is changed and to supply, to the foreign substance detection unit, a statistic of the measured electric characteristic value as the measurement value. With this, a statistic of electric characteristic value, which is measured in each time capacity is changed, is supplied as a measurement value.

Also, in the first aspect, a power feeding control unit configured to control electric energy of AC power and to supply the controlled AC power as the electric power and a filter circuit inserted between the power feeding control unit and the power feeding unit may be further included. With this, AC power is supplied through a filter circuit.

Also, in the first aspect, the power feeding unit may include a resonance circuit, and the measuring unit may measure a quality factor of the resonance circuit as the electric characteristic value. With this, a quality factor of a resonance circuit is measured as an electric characteristic value.

Also, in the first aspect, the measuring unit may measure inductance of the power feeding unit as the electric characteristic value. With this, inductance of a resonance circuit is measured as an electric characteristic value.

Also a second aspect of the is a power receiving apparatus including: a power receiving unit configured to receive electric power supplied by a power feeding apparatus through a magnetic field; a chassis including a conductor; and a transmitting unit configured to transmit, to the power feeding apparatus, a set value which is set previously. With this, a set value, which is set based on the quantity of conductors included in a chassis, is transmitted to a power feeding apparatus.

Also, in the second aspect of the present technique, the set value may be set based on a quantity of conductors included in the power receiving apparatus. With this, a value, which is set based on the quantity of conductors included in a power receiving apparatus, is transmitted to a power feeding apparatus.

Also, in the second aspect of the present technique, a chassis may be further included and the conductor may be included in the chassis. With this, a value, which is set based on the quantity of conductors included in a chassis, is transmitted to a power feeding apparatus.

Also, in the second aspect, the set value may be a threshold to be compared with a quality factor of a resonance circuit in the power feeding apparatus. With this, a threshold to be compared with a quality factor of a resonance circuit is transmitted to a power feeding apparatus.

Also, a third aspect of the present technique is a power feeding system including: a power receiving apparatus which includes a receiving unit configured to receive supplied electric power through a magnetic field, and a transmitting unit configured to transmit a set value which is set previously; and a power feeding apparatus which includes a power feeding unit configured to supply the electric power to the power receiving apparatus through the magnetic field, a measuring unit configured to measure an electric characteristic value of the power feeding unit and to generate a measurement value, a receiving unit configured to receive the set value transmitted by the transmitting unit, and a foreign substance detection unit configured to detect the foreign substance based on the set value and the measurement value. With this, a foreign substance in a magnetic field is detected based on a set value, which is set based on the quantity of conductors included in a chassis, and a measurement value.

Also, in the third aspect of the present technique, the set value may be set based on a quantity of conductors included in the power receiving apparatus. With this, a value, which is set based on the quantity of conductors included in a power receiving apparatus, is transmitted to a power feeding apparatus.

Also, in the third aspect, the power feeding unit may include a resonance circuit, and the measuring unit may measure a quality factor of the resonance circuit as the electric characteristic value. With this, a quality factor of a resonance circuit is measured as an electric characteristic value.

According to another aspect of the present technique, a power feeding apparatus is provided. The power feeding apparatus includes a power feeding unit configured to supply electric power to a power receiving apparatus through a magnetic field; a measuring unit configured to measure an electric characteristic value and to generate a measurement value; a power receiving unit configured to provide a set value; and a foreign substance detection unit configured to detect a foreign substance in the magnetic field based on the set value and the measurement value.

According to another aspect of the present technique, A power receiving apparatus is provided. The power received apparatus includes a power receiving unit configured to receive electric power supplied by a power feeding apparatus through a magnetic field; and a transmitting unit configured to transmit, to the power feeding apparatus, a set value.

According to another aspect of the present technique a power feeding system is provided. The power feeding system includes a power receiving apparatus including a power receiving unit configured to receive electric power through a magnetic field, and a transmitting unit configured to transmit a set value; a power feeding apparatus including a power feeding unit configured to supply the electric power to the power receiving apparatus through the magnetic field, a measuring unit configured to measure an electric characteristic value and to generate a measurement value, and a foreign substance detection unit configured to detect a foreign substance in the magnetic field based on the set value and the measurement value.

According to another aspect of the present technique, a method of controlling power feeding is provided. The method includes supplying electric power through a magnetic field from a power feeding apparatus to a power receiving apparatus; measuring an electric characteristic value and generating a measurement value based on the electric characteristic value; determining a set value; and detecting a foreign substance in the magnetic field based on the set value and the measurement value.

Advantageous Effects of Invention

According to an embodiment of the present technique, a foreign substance in a magnetic field can be detected accurately. Note that the effects described herein are not necessarily limited, and may be any of the effects described in the present disclosure.

BRIEF DESCRIPTION OF DRAWINGS

FIG. 1 is an example perspective view illustrating a contactless power feeding system according to a first embodiment.

FIG. 2 is a block diagram illustrating an example structure of a power feeding apparatus according to the first embodiment.

FIG. 3 is a graph illustrating an example of a relationship between a Q factor and the size of a foreign substance metal according to the first embodiment.

FIG. 4 is a block diagram illustrating an example structure of a power feeding control unit according to the first embodiment.

FIG. 5 is a block diagram illustrating an example structure of a measuring unit according to the first embodiment.

FIG. 6 is a graph illustrating an example of a relationship between a Q factor and an AC frequency according to the first embodiment.

FIG. 7 is a view illustrating an example of change in a frequency and a signal level of a test signal according to the first embodiment.

FIG. 8 is a block diagram illustrating an example structure of a power receiving apparatus according to the first embodiment.

FIG. 9 is a flowchart illustrating an example of operation of the power feeding apparatus according to the first embodiment.

FIG. 10 is a flowchart illustrating an example of Q factor measurement processing according to the first embodiment.

FIG. 11 is a flowchart illustrating an example of operation of the power receiving apparatus according to the first embodiment.

FIG. 12 is a block diagram illustrating an example structure of a foreign substance detection unit according to a modified example of the first embodiment.

FIG. 13 is a view illustrating an example of a threshold table according to the modified example of the first embodiment.

FIG. 14 is a block diagram illustrating an example structure of a power feeding apparatus according to a second example.

FIG. 15 is a block diagram illustrating an example structure of a measuring unit according to the second embodiment.

FIG. 16 is a block diagram illustrating an example structure of a power feeding apparatus according to a third embodiment.

FIG. 17 is a block diagram illustrating an example structure of a filter circuit according to the third embodiment.

FIG. 18 is a block diagram illustrating an example structure of a measuring unit according to the third embodiment.

FIG. 19 is a flowchart illustrating an example of Q factor measurement processing according to the third embodiment.

FIG. 20 is a block diagram illustrating an example structure of a power feeding apparatus according to a modified example of the third embodiment.

FIG. 21 is a block diagram illustrating an example structure of a filter circuit according to the modified example of the third embodiment.

FIG. 22 is a block diagram illustrating an example structure of a measuring unit according to the modified example of the third embodiment.

FIG. 23 is a block diagram illustrating an example structure of a foreign substance detection unit according to a fourth embodiment.

FIG. 24 is a graph illustrating an example of a decreased quantity of Q factor of each power receiving apparatus according to the fourth embodiment.

DESCRIPTION OF EMBODIMENTS

The following is a description of modes (hereinafter referred to as embodiments) for carrying out the present technique. The description will be made in the following order.

1. First Embodiment (example of receiving threshold and comparing received threshold with measurement value of Q factor)

2. Second Embodiment (example of controlling variable capacity, measuring Q factor, and comparing measured Q factor with threshold)

3. Third Embodiment (example of receiving threshold, comparing received threshold with measurement value of Q factor, and feeding power through filter circuit)

4. Fourth Embodiment (example of receiving decreased quantity of Q factor, calculating threshold, and comparing the calculated threshold with measurement value of Q factor)

1. First Embodiment

"Example Structure of Contactless Power Feeding System"

FIG. 1 is a perspective view illustrating an example structure of a contactless power feeding system according to a first embodiment. The contactless power feeding system is a system to supply electric power through a magnetic field in an electrically contactless manner. The contactless power feeding system includes a power feeding apparatus 100, and power receiving apparatuses 400 and 401. Note that the number of power receiving apparatuses is not limited to two, and the number may be one, or three or more.

The power feeding apparatus 100 supplies electric power, to the power receiving apparatuses 400 and 401, through a magnetic field in an electrically contactless manner. With such contactless feeding, charging can be performed by simple operation of a user, such as placing a power receiving apparatus 400 or 401 on the power feeding apparatus 100, without a terminal connection to an alternating current (AC) adapter or the like. Such a charging system reduces a load of a user.

The power feeding apparatus 100 is formed, for example, to include a plane surface having certain area. To a lower part or a surface of the plane surface (hereinafter referred to as "power feeding surface"), a power feeding coil to generate a magnetic field is arranged. In order to make it possible to place a plurality of power receiving apparatuses, such as the power receiving apparatuses 400 and 401, the plane surface of the power feeding surface is preferably and adequately larger than area of power receiving surfaces thereof. Here, the power receiving surface is a plane surface in which a power receiving coil to receive power source supplied through a magnetic field is arranged to a lower part or a surface thereof. By placing a plurality of power receiving apparatuses on the power feeding surface, it is possible to charge these apparatuses simultaneously or serially by the contactless power feeding system.

Note that the area of the power feeding surface is larger than the area of the power receiving surface, but is not limited to this structure. The two areas may have a similar size, or the area of the power feeding surface may be smaller than the area of the power receiving surface. Also, since charging can be performed only by bringing the power receiving apparatus 400 closer, whereby a shape of the power feeding apparatus 100 is not limited to a shape having a plane surface. For example, the power feeding apparatus 100 may have a stand-type shape, such as a desktop holder or a cradle.

When a power source is activated, the power feeding apparatus 100 detects whether the power receiving apparatus 400 is arranged on the power feeding surface of the power feeding apparatus 100. It is detected from change in a resistance value or a weight on the power feeding surface whether the power receiving apparatus 400 is placed.

When the power receiving apparatus 400 is placed, the power feeding apparatus 100 feeds, to the power receiving apparatus 400, electric energy W1 which is necessary minimum quantity to transmit/receive data. Then, the power feeding apparatus 100 receives data, which indicates a set value, from the power receiving apparatuses 400 and 401, and detects whether there is a foreign substance in a magnetic field based on the set value. Contents of the set value will be described later. When there is no foreign substance in the magnetic field, the power feeding apparatus 100 supplies, to the power receiving apparatus 400, electric energy W2 which is larger than the electric energy W1. The electric energy W2 is set to the adequate quantity for the power receiving apparatus 400 to charge a secondary cell. Hereinafter, it will be referred to as "main power feeding" to feed the electric energy W2. On the other hand, when there is a foreign substance, the power feeding apparatus 100 stops feeding power to the power receiving apparatus 400. Thus, generation of heat by the foreign substance can be prevented.

Here, a range of the magnetic field in which a foreign substance is detected is, for example, a range in which power transmission efficiency between a power feeding side and a power receiving side becomes higher than a predetermined value.

Note that the power feeding apparatus 100 performs detection of a foreign substance when the power receiving apparatus 400 is arranged on the power feeding surface, but is not limited to this structure. For example, when a power source is activated in the power feeding apparatus 100 or when operation (such as depressing switch) to start feeding power is performed, the detection of a foreign substance may be performed. Also, when receiving a command to request power feeding from the power receiving apparatus 400, the power feeding apparatus 100 may perform the detection of a foreign substance. Alternatively, the power feeding apparatus 100 may detect a foreign substance in certain time intervals.

The power receiving apparatus 400 receives electric power supplied by the power feeding apparatus 100 through a magnetic field. For example, an electronic device such as a mobile phone terminal or an electronic still camera is used as the power receiving apparatus 400. When receiving the electric energy W1, the power receiving apparatus 400 transmits data indicating a set value to the power feeding apparatus 100. Then, when receiving the electric energy W2, the power receiving apparatus 400 uses the electric energy W2 and performs charging of a secondary cell, and the like. A structure of the power receiving apparatus 401 is similar to that of the power receiving apparatus 400. Note that the power receiving apparatus 400 or 401 may be a device different from an electronic device such as an electric vehicle.

"Example Structure of Power Feeding Apparatus"

FIG. 2 is a block diagram illustrating an example structure of the power feeding apparatus 100 according to the first embodiment. The power feeding apparatus 100 includes a resonance circuit 110, a power feeding control unit 120, a communication unit 130, a measuring unit 140, and a foreign substance detection unit 160.

The resonance circuit 110 includes a capacitor 111 and a power feeding coil 112. One end of the power feeding coil 112 is connected, through a signal wire 117, to the power feeding control unit 120 and the communication unit 130, and the other end is connected to the capacitor 111. Also, one end of the capacitor 111 is connected to the power feeding coil 112, and also to the measuring unit 140 through a signal wire 119. The other end of the capacitor 111 is connected to the power feeding control unit 120 through a signal wire 116, and also to the measuring unit 140 through a signal wire 118.

The power feeding coil 112 receives AC power from the power feeding control unit 120 and generates a magnetic field according to the Ampere's law. Through the magnetic field, AC power is supplied to the power receiving apparatus 400.

The power feeding coil 112 is formed, for example, by winding a conductive wire rod. The number of turns is arbitrary. Note that the power feeding coil 112 may be formed by a method other than winding a conductive wire rod. For example, the power feeding coil 112 may be formed by forming a conductive pattern on a printed wiring board or a flexible printed board. Such a coil is called a pattern coil or a pattern loop. The pattern coil can be formed also by processing, for example, a board on which a conductive material is printed or evaporated, conductive sheet metal, or a conductive sheet. A coil on the power receiving side is in a similar manner.

The capacitor 111 is an element to accumulate or emit electric energy. A capacity value of the capacitor 111 is set in such a manner that a resonance frequency f1 of the resonance circuit 110 substantially matches a resonance frequency f2 on the power receiving side or is in a vicinity of the resonance frequency f2.

Note that the resonance circuit 110 is an example of a power feeding unit described in claims. Also, the power feeding apparatus 100 includes one resonance circuit 110, but may include a plurality of resonance circuits 110.

The power feeding control unit 120 supplies AC power to the resonance circuit 110 and also controls electric energy thereof. When the power receiving apparatus 400 is placed on the power feeding surface, the power feeding control unit 120 transmit an AC signal as a test signal through the signal wires 116 and 117 for a certain period of time. The test signal is a signal to measure a Q factor, and electric energy supplied by the test signal is lower than the electric energy W1.

When the transmission of the test signal ends, the power feeding control unit 120 supplies electric power having the electric energy W1 to the resonance circuit 110.

Then, the power feeding control unit 120 receives a detection result of a foreign substance from the foreign substance detection unit 160 and performs main power feeding when there is no foreign substance. That is, the power feeding control unit 120 supplies electric power having the electric energy W2 to the resonance circuit 110. On the other hand, when there is a foreign substance, the power feeding control unit 120 stops feeding power to the resonance circuit 110.

The communication unit 130 transmits/receives data to/from the power receiving apparatus 400. For example, the communication unit 130 transmits/receives data, which is superimposed to an AC signal by a load-modulation system, to/from the power receiving apparatus 400 through the power feeding coil 112. Data which the communication unit 130 receives from the power receiving apparatus 400 includes data indicating a threshold as a set value. The threshold is a Q factor of the resonance circuit 110 in a case where there is a foreign substance in a magnetic field in addition to the power receiving apparatus 400. The quantity of conductors differs according to the kind of power receiving apparatus 400, and thus, the threshold is previously set in the power receiving apparatus 400 based on the quantity thereof. The definition and a measuring method of a Q factor will be described later. The communication unit 130 supplies the received threshold to the foreign substance detection unit 160.

Note that the communication unit 130 is an example of a receiving unit described in claims. Also, the communication unit 130 transmits/receives data through the power feeding coil 112, but is not limited to this structure. For example, the power feeding apparatus 100 may include, other than the power feeding coil 112, a communication coil or an antenna to perform communication, and the communication unit 130 may transmit/receive data through the communication coil or the like.

Also, the communication unit 130 may transmit, to the power receiving apparatus 400, a transmission request command to request transmission of data indicating a threshold. In this case, the power receiving apparatus 400 transmits the data requested by the transmission request command and the communication unit 130 receives the data.

Also, the communication unit 130 may receive notification of charge completion or a command to request power feeding. When receiving the notification of charge completion, the power feeding apparatus 100 stops power feeding. Also, the communication unit 130 may transmit a detection result of a foreign substance to the power receiving apparatus 400. When receiving a detection result indicating that there is a foreign substance, the power receiving apparatus 400 stops charging the secondary cell and feeding power to a load in the power receiving apparatus, for example.

Also, the communication unit 130 receives a threshold as a set value. However, the set value only needs to be a value previously set based on the quantity of conductors included in the power receiving apparatus 400, and is not limited to a threshold. For example, as it will be described in a second embodiment, the communication unit 130 may receive area or volume of a conductor in the power receiving apparatus 400 as a set value. Here, a set value is set, for example, based on the quantity of conductors included in a chassis of the power receiving apparatus 400. However, a set value is not limited to this structure, and may be, for example, a value which is set based on the quantity of conductors used for a circuit or a component in the power receiving apparatus 400. Also, the set value may be a value which is set based on the quantity of conductors included in the power receiving apparatus 400 as a whole, such as a chassis, a circuit, a component, and the like.

The measuring unit 140 measures a quality factor, so-called a Q factor, of the resonance circuit 110. Here, the Q factor is an electric characteristic value related to power transmission efficiency between coils on a power feeding (primary) side and a power receiving (secondary) side (efficiency between coils) in a contactless power feeding system.

The theoretical maximum value of the efficiency between coils Emax is expressed in the following formula.

[Math. 1]

$$E_{max} = \frac{S^2}{\left(1 + \sqrt{1+S^2}\right)^2}$$ Formula 1

Also, S in the above formula is expressed in the following formula.

[Math. 2]

$$S = kQ_{total} = k\sqrt{Q_1 Q_2}$$ Formula 2

A Q factor of a whole contactless power feeding system is Qtotal in the above formula. Also, k is a coupling factor indicating a degree of electromagnetic coupling between a coil on the primary side and a coil on the secondary side, and fluctuates according to, for example, a positional relationship between the coil on the primary side and the coil on the secondary side. Q1 is a Q factor on the primary side (that is, Q factor of resonance circuit 110) and Q2 is a Q factor on the secondary side. From the formula 1 and the formula 2, the efficiency between coils Emax is calculated theoretically and uniquely from the coupling factor k and the Q factors on the primary side and secondary side. Also, the formula 1 and the formula 2 indicate that the higher the coupling factor k and each of the values of Q1 and Q2 become, the higher the efficiency between coils Emax becomes. Thus, even in a case where the coupling factor k is low, power transmission can be performed at high efficiency, as long as Q1 on the power feeding side or Q2 on the power receiving side is high.

Also, Q1 fluctuates when there is a foreign substance such as a metallic piece in a magnetic field supplied by the power feeding apparatus 100. This is because magnetic lines of force in the magnetic field pass through the metallic piece and an eddy current is generated in the metallic piece. Due to the generation of the eddy current, on an equivalent circuit, it looks like the metallic piece and the power feeding coil 112 are coupled electromagnetically and a resistance load is applied to the power feeding coil 112. Thus, the Q factor (Q1) of the resonance circuit 110 including the power feeding coil 112 becomes lower. Thus, from the Q factor of the resonance circuit 110, it is possible for the power feeding apparatus 100 to detect whether there is a foreign substance.

The measuring unit 140 measures the Q factor of the resonance circuit 110. The measuring unit 140 measures the Q factor of the resonance circuit 110 while a test signal is transmitted. Specifically, the measuring unit 140 measures voltage V1 on a side of the power feeding control unit 120 between both ends of the capacitor 111, and measures voltage V2 on a side of the power feeding coil 112 between the both ends of the capacitor 111. A unit of each V1 and V2 is, for example, a volt (V). Then, the measuring unit 140 calculates, from V1 and V2, the Q factor (Q1) of the resonance circuit 110 by using the following formula. The measuring unit 140 supplies, to the foreign substance detection unit 160, the measured Q factor as a measurement value.

$$Q1=V2/V1=2fL/rs \qquad \text{Formula 3}$$

In the above formula, f indicates a frequency of an AC signal (such as test signal) supplied to the power feeding coil 112, and a unit thereof is, for example, a hertz (Hz). Also, rs indicates an effective resistance value in the frequency f, and a unit thereof is, for example, an ohm. Also, L is inductance of the resonance circuit 110, and a unit thereof is a henry (H).

As described, when there is a foreign substance in the magnetic field generated by the power feeding coil 112, the effective resistance value rs increases. When the effective resistance value rs increases, Q1 becomes lower according to the formula 3. That is, when there is a foreign substance in the magnetic field, Q1 becomes lower.

The foreign substance detection unit 160 detects a foreign substance in the magnetic field from a threshold and a measurement value of a Q factor. The foreign substance detection unit 160 compares the threshold and the measurement value, and determines that there is a foreign substance in a case where the measurement value is equal to or lower than the threshold, and determines that there is no foreign substance in a case where the measurement value is not equal to or lower than the threshold. The foreign substance detection unit 160 supplies a detection result to the power feeding control unit 120.

Note that the foreign substance detection unit 160 compares the threshold with the Q factor directly, but is not limited to this structure. The threshold is a value which is set previously in the power receiving apparatus 400. However, the set threshold may be deviated from an appropriate threshold due to uneven quality of products or displacement of a coil. Thus, the foreign substance detection unit 160 may adjust the received threshold to a little lower value, and compare the adjusted threshold with the measurement value. The adjustment of a threshold is performed, for example, by subtracting a predetermined value from the threshold or by multiplying the threshold by a predetermined coefficient less than one.

Also, the foreign substance detection unit 160 detects a foreign substance from a comparison result between a threshold and a Q factor, but is not limited to this structure. The foreign substance detection unit 160 may compare an electric characteristic value, other than a Q factor, in the resonance circuit 110 with a threshold, and detect a foreign substance from the comparison result. For example, the measuring unit 140 may measure inductance of the resonance circuit 110 instead of a Q factor, and the foreign substance detection unit 160 may detect a foreign substance from a comparison result between the inductance and the threshold. Depending on the quality of material of a foreign substance, change in the inductance may be larger than change in the Q factor, and thus, it is possible for the foreign substance detection unit 160 to detect such a foreign substance from the comparison between the inductance and the threshold.

Also, the measuring unit 140 may measure a resonance frequency of the resonance circuit 110 instead of a Q factor, and the foreign substance detection unit 160 may detect a foreign substance from a comparison result between the measurement value and the threshold.

FIG. 3 is an example of a graph illustrating a relationship between a Q factor and the size of a foreign substance metal according to the first embodiment. A vertical axis in FIG. 3 indicates a Q factor of the power feeding coil 112 in the power feeding apparatus 100 in a case where there is a foreign substance metal in a magnetic field, a horizontal axis indicates the size of the foreign substance metal.

Here, as a foreign substance metal, an iron sample which is a hexahedron having a square upper surface and a square bottom surface is used. A distance (thickness) between the bottom surface and the upper surface of the foreign substance metal is, for example, one millimeter (mm). The length of a side of each of the upper surface and the bottom surface indicates the size of a foreign substance metal indicated in the horizontal axis in FIG. 3.

Also, a circle-mark indicates a plotted measurement value, of a Q factor of each size of a foreign substance metal, which is measured in a case where a power receiving apparatus A is placed in a magnetic field. A square-mark indicates each plotted measurement value which is measured in a case where a power receiving apparatus B is placed in the magnetic field. A triangular-mark indicates each plotted measurement value which is measured in a case where a power receiving apparatus C is placed in the magnetic field. A cross-mark indicates each plotted measurement value which is measured in a case where a power receiving apparatus D is placed in the magnetic field. Here, in respect to area of a conductor on a surface of a chassis in each of these power receiving apparatuses A, B, C, and D, it is assumed that A is the smallest, B is the second smallest, C is the third smallest, and D is the largest.

Note that a Q factor fluctuates also according to an arrangement position of a foreign substance or a power receiving apparatus, but it is assumed that each of the arrangement positions thereof is the same in each measurement. In addition to this, it is also assumed that each of various measurement conditions which may fluctuate a Q factor is the same in each measurement.

As exemplified in FIG. 3, a Q factor of when there is no foreign substance, that is when the size of a foreign substance metal is zero millimeter, differs greatly according to the kind of power receiving apparatus. In the power receiving apparatus A, a Q factor in this case is 80 or more, but in the power receiving apparatus D, a Q factor is 40 or less. Since the quantity of conductors included in each of the power receiving apparatuses is different from that of the others, Q factors are different in the same condition. For example, in a mobile device such as a smartphone, a conductor, such as metal, is used for considerable parts including a chassis. It is difficult to prevent magnetic lines of force in a magnetic field completely from passing through the conductor. When the magnetic lines of force pass through a conductor in such a power receiving apparatus, an eddy current flows due to electromagnetic induction effect. This mechanism is considerably similar to a mechanism of heat generation of a foreign substance. Thus, it is very difficult to determine, from the power feeding side, whether it is an eddy current flow through a conductor in the power receiving apparatus or an eddy current flow due to a metal foreign substance.

According to such a background, it is necessary to set a threshold, which is used for determination whether there is a foreign substance, based on the quantity of conductors included in a power receiving apparatus. When the same threshold is set to all of the power receiving apparatuses, a foreign substance may not be detected accurately. For example, a Q factor of the power receiving apparatus C in a case where there is no foreign substance is abound 55, and thus, it is supposed that a threshold corresponding to the size of a detection object of 5 millimeters is determined to be 45. On the other hand, in a measurement result of the power receiving apparatus A, the size of a foreign substance metal corresponding to the threshold of 45 is 12 millimeters. Thus, when a threshold of the power receiving apparatus C is applied to the power receiving apparatus A, it is possible to detect only a foreign substance equal to or larger than 12 millimeters in a case of charging the power receiving apparatus A.

Thus, different thresholds are set respectively for the power receiving apparatuses A, B, C, and D. For example, in a case where the size of a detection object S1 is around 5 millimeters (mm) and the power receiving apparatuses A, B, and C are placed, Q factors corresponding to S1 are set respectively as thresholds Th_A, Th_B, and Th_C. However, in a case where the power receiving apparatus D is placed, a Q factor corresponding to the size of a detection object S1 is not so different from a Q factor in a case where there is no foreign substance. Thus, in respect to the power receiving apparatus D, as an exception, S2 which is larger than S1 is set as the size of a detection object, and a Q factor corresponding to S2 is set as the threshold Th_D. Note that a Q factor corresponding to the size of a detection object is set as a threshold. However, a setting method is not limited to this setting method as long as a threshold, which makes it possible to detect a foreign substance, can be set based on the quantity of conductors in the power receiving apparatus. For example, a Q factor, of when a power receiving apparatus is placed and there is no foreign substance, may be calculated, and a value calculated by subtracting a predetermined value from the Q factor may be set as a threshold. Alternatively, a value calculated by multiplying a Q factor, of when a power receiving apparatus is placed and there is no foreign substance, by a predetermined coefficient less than one may be set as a threshold.

As exemplified in FIG. 3, the power receiving apparatus 400 stores a previously set threshold according to area of a conductor therein and transmits data indicating the set value to the power feeding apparatus 100.

"Example Structure of Power Feeding Control Unit"

FIG. 4 is a block diagram illustrating an example structure of the power feeding control unit 120 according to the first embodiment. The power feeding control unit 120 includes a switching control unit 121 and a switch unit 122. The switch unit 122 includes transistors 123, 124, 125, and 126.

The switching control unit 121 controls switching operation of the switch unit 122. When a power source of the power feeding apparatus 100 is activated, the switching control unit 121 supplies a control signal to the switch unit 122 and makes the switch unit 122 start switching operation at a certain switching frequency. In the switching operation, one of a pair of the transistors 123 and 124 and a pair of the transistors 125 and 126 is controlled to be turned on and the other is controlled to be turned off. The pair to be turned on is changed in a period corresponding to a switching frequency. Thus, the pair of transistors 123 and 124 and the pair of transistors 125 and 126 are alternately turned on and off.

First, the switching control unit 121 controls the switching frequency to n (n is integer of 2 or more) different frequencies serially in certain intervals and searches a resonance frequency. Thus, a plurality of test signals having different frequencies are serially generated and are output from the power feeding control unit 120. Control, in which a frequency is changed serially in certain intervals in such a manner, is called a frequency sweep.

Here, a resonance frequency fluctuates according to uneven quality of components in the power feeding apparatus 100, variability in a positional relationship between a power feeding coil and a power receiving coil and in a positional relationship between a power feeding coil or a power receiving coil and metal included in a chassis, a position or a size of a foreign substance, or the like. Thus, it is necessary to set, as a set value, a resonance frequency in an ideal case where there is no foreign substance and there is no variability in various positional relationships, and to perform a frequency sweep in a frequency band of a certain range including the set value, in order to search an actual resonance frequency.

For example, in a case where a set value is 100 kilohertz (kHz), the frequency sweep is performed at a 400 Hz step on 42 frequencies, in a band from 88 to 105 kilohertz. Among these frequencies, a frequency having the highest Q factor of the resonance circuit 110 is acquired as a resonance frequency.

Also, when a frequency is changed in the frequency sweep, due to a transient response, it takes a certain period of time before amplitude of a test signal becomes a constant level. Thus, in the measuring unit 140, when a certain period of time has passed since a frequency is changed and when the amplitude becomes a constant level, measurement is started.

After performing the frequency sweep, the switching control unit 121 supplies electric power having the electric energy W1 to the switch unit 122 by a resonance frequency. The electric energy is controlled, for example, by voltage of a control signal supplied to the switch unit 122.

After supplying the electric power having the electric energy W1, the switching control unit 121 receives a detection result of a foreign substance from the foreign substance detection unit 160, and stops switching operation of the switch unit 122 when there is a foreign substance. Thus, the power feeding is stopped. On the other hand, when there is no foreign substance, the switching control unit 121 makes the switch unit 122 perform switching operation by a resonance frequency and main power feeding by electric power having the electric energy W2.

The transistors 123, 124, 125, and 126 are switching elements which are turned on and off according to control by the switching control unit 121. As each of the transistors 123, 124, 125, and 126, for example, a MOS transistor is used. Gates of the transistors 123 and 124 are connected to the switching control unit 121, sources thereof are connected to an earth terminal, and drains thereof are connected to the capacitor 111. Gates of the transistors 125 and 126 are connected to the switching control unit 121, sources thereof are connected to the earth terminal, and drains thereof are connected to the power feeding coil 112. In FIG. 4, signal wires to connect the transistors in the switch unit 122 and the switching control unit 121 are omitted.

FIG. 5 is a block diagram illustrating an example structure of the measuring unit 140 according to the first embodiment. The measuring unit 140 includes buffer circuits 141 and 142, rectifying units 143 and 144, an A/D converter 145, and a Q factor acquisition unit 146.

The buffer circuit 141 divides voltage of the test signal received, through the signal wire 118, from the resonance circuit 110 at a certain ratio and supplies the divided voltage to the rectifying unit 143. The buffer circuit 142 divides voltage of the test signal received, through the signal wire 119, from the resonance circuit 110 at a certain ratio and supplies the divided voltage to the rectifying unit 144. For example, an attenuator is used as each of the buffer circuits 141 and 142.

Each of the rectifying units 143 and 144 rectifies an AC test signal into a DC signal. Each of the rectifying units 143 and 144 supplies the rectified DC signal to the A/D converter 145.

The A/D converter 145 converts an analog DC signal into a digital signal and supplies the converted signal to the Q factor acquisition unit 146.

The Q factor acquisition unit 146 calculates a Q factor from voltage of the DC signal. The Q factor acquisition unit 146 calculates a Q factor by using the formula 3 with voltage of the DC signal from the rectifying unit 143 as voltage V1 and voltage of the DC signal from the rectifying unit 144 as voltage V2, and holds the calculated Q factor in a memory (not illustrated) or the like. At each time a frequency of a test signal is changed, the Q factor acquisition unit 146 calculates a Q factor. For example, when the frequency sweep is performed in respect to n frequencies, n Q factors are calculated.

However, as described, due to a transient response, amplitude does not become a constant level for a certain period of time from a frequency change. Thus, the Q factor acquisition unit 146 calculates a Q factor in a measurement period which is after the certain period of time and until a next frequency change.

When calculating n Q factors, the Q factor acquisition unit 146 selects the maximum value among these Q factors, and supplies the maximum value, as a measurement value, to the foreign substance detection unit 160.

Note that the measuring unit 140 calculates a Q factor by measuring voltage of a rectified DC signal, but may calculate a Q factor by measuring amplitude of an AC signal which is not yet rectified.

FIG. 6 is a graph illustrating an example of a relationship between a Q factor and an AC frequency according to the first embodiment. A vertical axis in FIG. 6 indicates a Q factor on the power feeding (primary) side and a horizontal axis indicates an AC frequency of a test signal. As illustrated in FIG. 6, the power feeding apparatus 100 performs a frequency sweep in respect to each of n AC frequencies, and measures a Q factor for n times. A Q factor becomes the highest when an AC frequency substantially matches a resonance frequency fp. The power feeding apparatus 100 compares a measurement value Qp at the resonance frequency fp with a threshold, and detects a foreign substance from the comparison result.

FIG. 7 is a view illustrating an example of change in a frequency and a signal level of a test signal according to the first embodiment. In FIG. 7, a vertical axis indicates a signal level of a test signal, and a horizontal axis indicates time. As illustrated in FIG. 7, a frequency of a test signal is changed in certain time intervals. Then, for example, when X millisecond (ms) is passed since a test signal is controlled to a certain frequency, amplitude of the test signal becomes a constant level. The power feeding apparatus 100 measures a Q factor in a measurement period which is from a moment X millisecond (ms) is passed and to a moment Y millisecond (ms) is further passed. When the measurement period is passed, a frequency of the test signal is controlled to be a next frequency.

"Example Structure of Power Receiving Apparatus"

FIG. 8 is a block diagram illustrating an example structure of the power receiving apparatus 400 according to the first embodiment. The power receiving apparatus 400 includes a resonance circuit 410, a charging control unit 420, a communication unit 430, a storage unit 440, and a secondary cell 450.

The resonance circuit 410 receives electric power supplied by the power feeding apparatus 100 through a magnetic field. The resonance circuit 410 includes a capacitor 411 and a power receiving coil 412. One end of the power receiving coil 412 is connected to the charging control unit 420 and the communication unit 430, and the other end is connected to the capacitor 411. Also, one end of the capacitor 411 is connected to the power receiving coil 412, and the other end is connected to the charging control unit 420.

The power receiving coil 412 receives electric power supplied by the power feeding apparatus 100 through a magnetic field. When a magnetic field is supplied by the power feeding apparatus 100, the power receiving coil 412 generates induction voltage corresponding to change in magnetic flux of the magnetic field, according to a law of electromagnetic induction.

The capacitor 411 is an element to accumulate or emit electric energy. A capacity value of the capacitor 411 is set in such a manner that a resonance frequency f2 of the resonance circuit 410 substantially matches a resonance frequency f1 on the power feeding side or is in a vicinity of the resonance frequency f1.

Note that the resonance circuit 410 is an example of a power receiving unit described in claims. Also, the power receiving apparatus 400 includes one resonance circuit 410, but may include a plurality of resonance circuits 410.

The charging control unit 420 charges the secondary cell 450. The charging control unit 420 converts the AC power, which is received through the resonance circuit 410, into DC power, and charges the secondary cell 450 by using the DC power. Also, while charging the secondary cell 450, the charging control unit 420 supplies, a part of the electric power to be charged, to a load circuit (not illustrated) including various functions such as a telephone-call function, and a display function.

The communication unit 430 transmits/receives data to/from the power feeding apparatus 100. For example, the communication unit 430 transmits/receives data, which is superimposed to an AC signal by a load-modulation system or the like, to/from the power receiving apparatus 400 through the power receiving coil 412. When receiving the electric energy W1 through the resonance circuit 410, the communication unit 430 reads a threshold from the storage unit 440, and superimposes data indicating the threshold to an AC signal and transmits the AC signal to the power feeding apparatus 100.

Note that the communication unit 430 is an example of a transmitting unit described in claims. Also, the communication unit 430 transmits/receives data through the power receiving coil 412, but is not limited to this structure. For example, the power receiving apparatus 400 may include, other than the power receiving coil 412, a communication coil or an antenna to perform communication, and the communication unit 430 may transmit/receive data through the communication coil or the like.

Also, the communication unit 430 may receive, from the power feeding apparatus 100, a transmission request command to request transmission of data indicating a threshold. In this case, the communication unit 430 transmits the data requested by the transmission request command.

Also, the communication unit 430 may transmit notification of charge completion or a command to request power feeding. Also, the communication unit 430 may receive a detection result of a foreign substance from the power receiving apparatus 400.

The storage unit 440 stores a threshold. The secondary cell 450 stores the electric power charged by the charging control unit 420. For example, a lithium-ion battery is used as the secondary cell 450.

"Operation Example of Power Feeding Apparatus"

FIG. 9 is a flowchart illustrating an example of operation of the power feeding apparatus 100 according to the first embodiment. This operation is started, for example, when the power feeding apparatus 100 detects that the power receiving apparatus 400 is placed on the power feeding surface.

First, the power feeding apparatus 100 performs a Q factor measurement processing to measure a Q factor (step S910). Then, the power feeding apparatus 100 supplies, through a magnetic field, the electric energy W1, which is the minimum quantity to make it possible for the power receiving apparatus 400 to communicate (step S901).

Then, the power feeding apparatus 100 receives data indicating a threshold from the power receiving apparatus 400 (step S902). The power feeding apparatus 100 compares the measured Q factor and the threshold, and determines whether the Q factor is higher than the threshold (that is, there is no foreign substance) (step S903).

When the Q factor is higher than the threshold (step S903: Yes), the power feeding apparatus 100 feeds electric power having the electric energy W2 which is higher than the electric energy W1 (step S904). On the other hand, when the Q factor is equal to or lower than the threshold (step S903: No), the power feeding apparatus 100 stops power feeding (step S905). After step S904 or S905, the power feeding apparatus 100 stops operating.

FIG. 10 is a flowchart illustrating an example of Q factor measurement processing according to the first embodiment. The power feeding apparatus 100 supplies a test signal and determines whether a certain period of time has passed since the supply is started (step S913). When the certain period of time has not passed (step S913: No), the power feeding apparatus 100 goes back to step S913.

When the certain period of time has passed (step S913: Yes), the power feeding apparatus 100 measures the voltage V1 and V2 (step S914). Then, the power feeding apparatus 100 calculates a Q factor from the voltage by using the formula 3 (step S915). The power feeding apparatus 100 determines whether the number of times of measurement has reached n (step S916).

When the number of times of measurement is less than n (step S916: No), the power feeding apparatus 100 changes an AC frequency of the test signal (step S917) and goes back to step S913. On the other hand, when the number of times of measurement reaches n (step S916: Yes), the power feeding apparatus 100 selects, among n Q factors, the maximum value as a definitive measurement value (step S918). After step S918, the power feeding apparatus 100 ends the Q factor measurement processing.

"Operation Example of Power Receiving Apparatus"

FIG. 11 is a flowchart illustrating an example of operation of the power receiving apparatus 400 according to the first embodiment. This operation is started, for example, when the power receiving apparatus 400 receives electric power having the electric energy W1.

The power receiving apparatus 400 transmits data indicating a threshold to the power feeding apparatus 100 (step S951). Then, the power receiving apparatus 400 determines whether electric power having the electric energy W2 is received (step S952). When the electric power having the electric energy W2 is not received (step S952: No), the power receiving apparatus 400 goes back to step S952.

When the electric power having the electric energy W2 is received (step S952: Yes), the power receiving apparatus 400 uses the electric power, for example, to charge the secondary cell (step S953). After step S953, the power receiving apparatus 400 ends the operation.

In such a manner, according to the first embodiment of the present technique, the power feeding apparatus 100 receives a threshold, which is set based on the quantity of conductors in the power receiving apparatus, and compares the received threshold with a measurement value of a Q factor. Thus, in a system using various power receiving apparatuses, it is possible to detect a foreign substance in a magnetic field accurately.

"Modification"

In the first embodiment, the power feeding apparatus 100 receives a threshold of a Q factor as a set value, but may receive a value other than a threshold as a set value, as long as the value is set based on the quantity of conductors in the power receiving apparatus. For example, the power feeding apparatus 100 may receive surface area of a conductor on a surface of a chassis of the power receiving apparatus 400 as a set value. A power feeding apparatus 100 which is a modified example of the first embodiment is different from that of the first embodiment in a point that surface area of a conductor in a power receiving apparatus 400 is received as a set value.

FIG. 12 is a block diagram illustrating an example structure of a foreign substance detection unit 160 according to the modified example of the first embodiment. The foreign substance detection unit 160 includes a threshold table 161, a threshold acquisition unit 162, and a comparison unit 163.

The threshold table 161 is a table in which thresholds respectively correspond to possible ranges of surface area of a conductor in a power receiving apparatus. The threshold acquisition unit 162 receives area of a conductor in the power receiving apparatus 400 from a communication unit 130, and reads a threshold corresponding to the area from the threshold table 161. The threshold acquisition unit 162 supplies the acquired threshold to the comparison unit 163. The comparison unit 163 compares the acquired threshold and a measurement value of a Q factor and detects a foreign substance from a comparison result. The comparison unit 163 supplies a detection result to a power feeding control unit 120.

Note that the threshold acquisition unit 162 reads a threshold from the threshold table 161, but is not limited to this structure. For example, the threshold acquisition unit 162 may use a relational expression between area and a threshold and calculate a threshold from area to acquire a threshold.

FIG. 13 is a view illustrating an example of the threshold table 161 according to the modified example of the first embodiment. In the threshold table 161, thresholds, respectively corresponding to possible ranges of surface area of a conductor in the power receiving apparatus, are described. For example, a threshold Th_A corresponding to a range of area from 0 to A1 square millimeters (mm2) is described, and a threshold Th_B corresponding to a range of area from A1 to A2 square millimeters is described. Also, a threshold Th_C corresponding to a range of area from A2 to A3 square millimeters is described, and a threshold Th_D corresponding to a range of area from A3 to A4 square millimeters is described.

2. Second Embodiment

In the first embodiment, the power feeding apparatus 100 controls a frequency of a test signal by controlling a switching frequency. However, to control a switching frequency in small steps, a circuit to operate at a high clock becomes necessary, and thus, a load of the power feeding apparatus 100 becomes high. On the other hand, in a structure in which a frequency of a test signal is controlled by control of capacity of the resonance circuit, a circuit operating at a high clock is not necessary. Thus, a load of the power feeding apparatus 100 becomes low. A power feeding apparatus 100 according to the second embodiment is different from that of the first embodiment in a point that a frequency of a test signal is controlled by control of capacity of a resonance circuit.

"Example Structure of Power Feeding Apparatus"

FIG. 14 is a block diagram illustrating an example structure of the power feeding apparatus 100 according to the second embodiment. The power feeding apparatus 100 according to the second embodiment is different from that of the first embodiment in a point that a measuring unit 150 is included instead of the measuring unit 140. Also, in the second embodiment, only one end, on a side of a capacitor 111, of a power feeding coil 112 is connected to the measuring unit 150 through a signal wire 119.

The measuring unit 150 generates a test signal and controls a frequency of a test signal by controlling capacity of a resonance circuit. Also, the measuring unit 150 measures a Q factor at each time a frequency is changed.

Also, a switching control unit 121 of the second embodiment does not transmit a test signal. While the measuring unit 150 transmits a test signal, the switching control unit 121 controls transistors 123 and 124 to be turned off and transistors 125 and 126 to be turned on. When receiving a detection result indicating that there is no foreign substance, the switching control unit 121 makes a switch unit 122 start switching operation.

"Example Structure of Measuring Unit"

FIG. 15 is a block diagram illustrating an example structure of the measuring unit 150 according to the second embodiment. The measuring unit 150 of the second embodiment is different from the first embodiment in a point that variable capacity 147, an AC power source 151, and a variable capacity control unit 152 are further included.

The variable capacity 147 is an element capacity of which is changed according to the control by the variable capacity control unit 152. As the variable capacity 147, for example, a variable capacity diode (so-called varicap) or a micro electro mechanical system (MEMS) variable capacity element is used. One end of the variable capacity 147 is connected to a buffer circuit 141 and the power feeding coil 112, and the other end is connected to a buffer circuit 142 and the AC power source 151. The AC power source 151 supplies an AC signal of a fixed frequency as a test signal. The variable capacity control unit 152 serially changes capacity of the variable capacity 147 in certain intervals. A serial resonance circuit includes the power feeding coil 112 and the variable capacity 147. The variable capacity control unit 152 changes capacity of the circuit, and thus, a frequency of a test signal output through the circuit is changed.

In such a manner, according to the second embodiment, the power feeding apparatus 100 changes capacity of the variable capacity 147 to change a frequency of a test signal, and thus, it is not necessary to control a switching frequency in measurement of a Q factor. Thus, a load of the power feeding apparatus 100 is reduced.

3. Third Embodiment

In the first embodiment, the power feeding control unit 120 supplies electric power not through a filter circuit, but may supply electric power through a filter circuit or the like to reduce harmonic. A power feeding control unit 120 according to the third embodiment is different from that of the first embodiment in a point that electric power is supplied through a filter circuit.

"Example Structure of Power Feeding Apparatus"

FIG. 16 is a block diagram illustrating an example structure of the power feeding apparatus 100 according to the third embodiment. The power feeding apparatus 100 according to the third embodiment is different from that of the first embodiment in a point that a measuring unit 155 is included instead of the measuring unit 140 and that a filter circuit 170 is further included. Also, the power feeding apparatus 100 according to the third embodiment is different from that of the first embodiment in a point that a capacitor 113 is further included in a resonance circuit 110.

The filter circuit 170 lets an AC signal in a predetermined frequency band pass through. For example, a low-pass filter to let a frequency in a frequency band, which is lower than a cutoff frequency, pass through is used as the filter circuit 170. The filter circuit 170 is provided between a power feeding control unit 120 and the resonance circuit 110, and the power feeding control unit 120 supplies electric power to the resonance circuit 110 through the filter circuit 170. Thus, the power feeding apparatus 100 can control generation of harmonic.

One end of the capacitor 113 is connected to a power feeding coil 112. Also, the other end of the capacitor 113 is connected to the filter circuit 170 through a signal wire 117 and connected to the measuring unit 155 through a signal wire 115.

Also, one end, on a side of the filter circuit 170, of a capacitor 111 of the third embodiment is connected to the measuring unit 155 through signal wires 114 and 118, and the other end is connected to the measuring unit 155 through a signal wire 119.

The measuring unit 155 generates a test signal and changes a frequency of the test signal in certain intervals. Also, the measuring unit 155 measures a Q factor at each time a frequency is changed.

The power feeding control unit 120 of the third embodiment stops power feeding in a period in which a test signal is generated. When the period ends, the power feeding control unit 120 supplies electric power having the electric energy W1. Subsequently, when receiving a detection result indicating that there is no foreign substance, the power feeding control unit 120 supplies electric power having the electric energy W2.

"Example Structure of Filter Circuit"

FIG. 17 is a block diagram illustrating an example structure of the filter circuit 170 according to the third embodiment. The filter circuit 170 includes inductors 171 and 173 and a capacitor 172.

One end of the capacitor 172 is connected to the capacitor 111 and the inductor 171, and the other end is connected to the capacitor 111 and the inductor 173. One end of the inductor 171 is connected to the capacitor 172 and the capacitor 111, and the other end is connected to the power feeding control unit 120. One end of the inductor 173 is connected to the capacitor 172 and the capacitor 113, and the other end is connected to the power feeding control unit 120.

In such a manner, a secondary low-pass filter is formed by the capacitor 172, which is connected in parallel with a signal wire to which AC power is supplied, and the inductors 171 and 173, which are connected in series with the signal wire.

"Example Structure of Measuring Unit"

FIG. 18 is a block diagram illustrating an example structure of the measuring unit 155 according to the third embodiment. The measuring unit 155 is different from the measuring unit 140 of the first embodiment in a point that a measurement control unit 156, a test signal supplying unit 157, and transistors 158 and 159 are further included.

Each of the transistors 158 and 159 is a switching element which is turned on and off according to control by the measurement control unit 156. As each of the transistors 158 and 159, for example, a MOS transistor is used. A gate of the transistor 158 is connected to the measurement control unit 156, a source thereof is connected to the test signal supplying unit 157, and a drain thereof is connected to the capacitor 111 through the signal wire 114. Also, a gate of the transistor 159 is connected to the measurement control unit 156, a source thereof is connected to an earth terminal, and a drain thereof is connected to the capacitor 113 through the signal wire 115.

The test signal supplying unit 157 supplies a test signal not through the filter circuit 170 and controls a frequency of the test signal (perform frequency sweep) in certain intervals. Since it becomes difficult to calculate a Q factor due to a capacity component in the filter circuit 170 when a test signal is supplied through the filter circuit 170, a test signal is supplied not through the filter circuit 170.

The measurement control unit 156 controls the test signal supplying unit 157 and the transistors 158 and 159. When a power receiving apparatus 400 is arranged on a power feeding surface, the measurement control unit 156 controls the transistor 158 and 159 to be turned on and makes the test signal supplying unit 157 start a frequency sweep. When the frequency sweep ends, the measurement control unit 156 controls the transistors 158 and 159 to be turned off.

"Operation Example of Power Feeding Apparatus"

FIG. 19 is a flowchart illustrating an example of Q factor measurement processing according to the third embodiment. The Q factor measurement processing of the third embodiment is different from that of the first embodiment in a point that step S911 and step S912 are further performed.

The power feeding apparatus 100 stops feeding power through the filter circuit 170 (step S911) and outputs a test signal not through the filter circuit 170 (step S912). Then, the power feeding apparatus 100 performs steps S913 to S918.

In this manner, according to the third embodiment, the power feeding apparatus 100 supplies a test signal not through the filter circuit 170 and measures a Q factor, and thus, it is possible to measure a Q factor easily in a system including the filter circuit 170.

"Modification"

In the third embodiment, the filter circuit 170 including two inductors is used. However, there may be one inductor in the filter circuit 170. A power feeding apparatus 100 which is a modified example of the third embodiment is different from that of the third embodiment in a point that a filter circuit 170 including one inductor is used.

"Example Structure of Power Feeding Apparatus"

FIG. 20 is a block diagram illustrating an example structure of the power feeding apparatus 100 according to the modified example of the third embodiment. A resonance circuit 110 of the modified example is similar to that of the first example.

The filter circuit 170 of the modified example is different from the filter circuit 170 of the third embodiment in a point that one inductor is included. A measuring unit 155 of the modified example is different from that of the third embodiment in a point that a signal wire 115 is not connected thereto.

"Example Structure of Filter Circuit"

FIG. 21 is a block diagram illustrating an example structure of the filter circuit 170 according to the modified example of the third embodiment. The filter circuit 170 of the modified example is different from that of the third embodiment in a point that no inductor 173 is included.

"Example Structure of Measuring Unit"

FIG. 22 is a block diagram illustrating an example structure of the measuring unit 155 according to the modified example of the third embodiment. The measuring unit 155 of the modified example is different from that of the third embodiment in a point that no transistor 159 is included.

In such a manner, according to the modified example, the number of elements such as an inductor of the filter circuit 170 can be reduced.

4. Fourth Embodiment

In the first embodiment, the power feeding apparatus 100 receives a threshold of a Q factor as a set value, but may receive a value other than a threshold as a set value, as long as the value is set based on the quantity of conductors in the power receiving apparatus. For example, the power feeding apparatus 100 may receive, as a set value, the decreased quantity of Q factor due to an arrangement of the power receiving apparatus 400 in a magnetic field. A power feeding apparatus 100 of the fourth embodiment is different from that of the first embodiment in a point that the decreased quantity dQ of Q factor due to an arrangement of a power receiving apparatus 400 in a magnetic field is received as a set value.

"Example Structure of Foreign Substance Detection Unit"

FIG. 23 is a block diagram illustrating an example structure of a foreign substance detection unit 160 according to the fourth embodiment. The foreign substance detection unit 160 includes a threshold acquisition unit 164 and a comparison unit 163.

The threshold acquisition unit 164 acquires a threshold based on the decreased quantity dQ of Q factor due to an arrangement of the power receiving apparatus 400 in a magnetic field. Here, a Q factor on a power feeding side, of when a foreign substance and the power receiving apparatus 400 are not arranged in a magnetic field, is assumed as a basic value Qs, and a Q factor on the power feeding side, of when the power receiving apparatus 400 is arranged in a magnetic field with no foreign substance, is assumed as Qt. Difference between Qs and Qt is used as a decreased quantity dQ. The threshold acquisition unit 164 calculates Qt, of when the power receiving apparatus 400 is arranged, from the decreased quantity dQ and the basic value Qs. For example, Qt is calculated by subtracting dQ from the basic value Qs. Note that instead of difference between Qs and Qt, a ratio of Qt to Qs may be used as the decreased quantity.

Then, the threshold acquisition unit 164 reduces the calculated Qt for a certain quantity or a certain ratio and sets the reduced value as a threshold. For example, a threshold is calculated by processing of subtracting a fixed quantity dQ_f from Qt or processing of multiplying Qt by a predetermined coefficient less than one. The threshold acquisition unit 164 supplies the acquired threshold to the comparison unit 163. The comparison unit 163 compares the threshold with a measurement value of a Q factor, and detects a foreign substance from the comparison result.

FIG. 24 is a graph illustrating an example of the decreased quantity of Q factor of each power receiving apparatus according to the fourth embodiment. A vertical axis in FIG. 24 indicates a Q factor of the power feeding coil 112 in the power feeding apparatus 100 in a case where there is a foreign substance metal in a magnetic field. A horizontal axis in FIG. 24 indicates the size of a foreign substance metal.

A Q factor on a primary side, of when there is none of a foreign substance and power receiving apparatuses A, B, C, and D in a magnetic field, is previously measured as a basic value Qs. Also, a Q factor on the primary side, of when there is no foreign substance and there is only the power receiving apparatus A in the magnetic field, is previously measured as Qt_A, and a Q factor on the primary side, of when there is only the power receiving apparatus B in the magnetic field, is measured as Qt_B. A Q factor, of when there is no foreign substance and there is only the power receiving apparatus C in the magnetic field, is previously measured as Qt_C, and a Q factor, of when there is only the power receiving apparatus D in the magnetic field, is measured as Qt_D.

Difference between the basic value Qs and Qt_A is set as a decreased quantity dQ_A due to an arrangement of the power receiving apparatus A, and difference between the basic value Qs and Qt_B is set as a decreased quantity dQ_B due to an arrangement of the power receiving apparatus B. Also, difference between the basic value Qs and Qt_C is set as a decreased quantity dQ_C due to an arrangement of the power receiving apparatus C, and difference between the basic value Qs and Qt_D is set as a decreased quantity dQ_C due to an arrangement of the power receiving apparatus D.

Since the power receiving apparatuses A, B, C, and D have different quantities of conductors, the power receiving apparatuses have different decreased quantities.

When receiving the decreased quantity, the power feeding apparatus 100 acquires, as a threshold, a value in which the decreased quantity dQ and the fixed quantity dQ_f are subtracted from the basic value.

In such a manner, according to the fourth embodiment, the power feeding apparatus 100 receives, as a set value, a decreased quantity of Q factor due to an arrangement of a power receiving apparatus, and detects a foreign substance. Thus, in a system using various power receiving apparatuses having different decreased quantities, it is possible to detect a foreign substance in a magnetic field accurately.

Note that the embodiments described above are examples to embody the present technique, and matters according to the embodiments and matters used to specify the invention according to claims correspond to each other. Similarly, the matters used to specify the invention according to claims and the matters according to the embodiments of the present technique, to which the same names are assigned, correspond to each other. However, the present technique is not limited to the embodiments thereof, and can be embodied by making various modifications to the embodiments within the scope thereof.

Also, the processing steps described in the above embodiments can be seen as a method including a series of the steps, or also can be seen as a program to make a computer perform the series of steps or a recording medium to store the program. As this recording medium, such as a compact disc (CD), a mini disc (MD), a digital versatile disc (DVD), a memory card, a Blu-ray Disc (registered trademark) can be used.

Note that the effects described herein are not necessarily limited, and may be any of the effects described in the present disclosure.

The present technique may also be embodied in the following structures.

(1) A power feeding apparatus including: a power feeding unit configured to supply electric power to a power receiving apparatus through a magnetic field; a measuring unit configured to measure an electric characteristic value of the power feeding unit and to generate a measurement value; a receiving unit configured to receive a set value which is set in the power receiving apparatus; and a foreign substance detection unit configured to detect a foreign substance in the magnetic field based on the set value and the measurement value.

(2) The power feeding apparatus according to (1), wherein the set value is set based on a quantity of conductors included in the power receiving apparatus.

(3) The power feeding apparatus according to (1) or (2), wherein the set value is a threshold used for detection of the foreign substance, and the foreign substance detection unit compares the threshold and the measurement value and detects the foreign substance based on the comparison result.

(4) The power feeding apparatus according to any one of (1) to (3), wherein the set value is a variation of the electric characteristic value changed due to an arrangement of the power receiving apparatus in the magnetic field.

(5) The power feeding apparatus according to any one of (1) to (4), wherein the set value is surface area of the conductor.

(6) The power feeding apparatus according to any one of (1) to (5), wherein the power feeding unit further supplies a plurality of AC signals having different frequencies serially as test signals through the magnetic field, and the measuring unit measures the electric characteristic value at each time any of the plurality of test signals is supplied and supplies, to the foreign substance detection unit, a statistic of the measured electric characteristic value as the measurement value.

(7) The power feeding apparatus according to any one of (1) to (6), wherein the measuring unit serially supplies, as test signals, a plurality of AC signals having different frequencies through the magnetic field, and supplies, as the measurement value, a statistic of the electric characteristic value, which is measured at each time each of the test signals is supplied, to the foreign substance detection unit.

(8) The power feeding apparatus according to any one of (1) to (7), wherein the power feeding unit includes a power feeding coil configured to supply the electric power through the magnetic field, and the measuring unit includes a variable capacity connected to the power feeding coil, an AC power source configured to supply, as a test signal, the AC signal having a predetermined frequency to the power feeding unit through the variable capacity, a variable capacity control unit configured to change a frequency of the test signal by changing capacity of the variable capacity for a predetermined number of times, a measurement value supplying unit configured to measure the electric characteristic value at each time the capacity is changed and to supply, to the foreign substance detection unit, a statistic of the measured electric characteristic value as the measurement value.

(9) The power feeding apparatus according to any one of (1) to (8), further including: a power feeding control unit configured to control electric energy of AC power and to supply the controlled AC power as the electric power; and a filter circuit inserted between the power feeding control unit and the power feeding unit.

(10) The power feeding apparatus according to any one of (1) to (9), wherein the power feeding unit includes a resonance circuit, and the measuring unit measures a quality factor of the resonance circuit as the electric characteristic value.

(11) The power feeding apparatus according to any one of (1) to (9), wherein the measuring unit measures inductance of the power feeding unit as the electric characteristic value.

(12) A power receiving apparatus including: a power receiving unit configured to receive electric power supplied by a power feeding apparatus through a magnetic field; a chassis including a conductor; and a transmitting unit configured to transmit, to the power feeding apparatus, a set value which is set previously.

(13) The power receiving apparatus according to (12), wherein the set value is set based on a quantity of conductors included in the power receiving apparatus.

(14) The power receiving apparatus according to (13), further including a chassis, wherein the conductor is included in the chassis.

(15) The power receiving apparatus according to any one of (12) to (14), wherein the set value is a threshold to be compared with a quality factor of a resonance circuit in the power feeding apparatus.

(16) A power feeding system including: a power receiving apparatus which includes a receiving unit configured to receive supplied electric power through a magnetic field, and a transmitting unit configured to transmit a set value which is set previously; and a power feeding apparatus which includes a power feeding unit configured to supply the electric power to the power receiving apparatus through the magnetic field, a measuring unit configured to measure an electric characteristic value of the power feeding unit and to generate a measurement value, a receiving unit configured to receive the set value transmitted by the transmitting unit, and a foreign substance detection unit configured to detect the foreign substance based on the set value and the measurement value.

(17) The power feeding system according to (16), wherein the set value is set based on a quantity of conductors included in the power receiving apparatus.

(18) The power feeding system according to (16) or (17), wherein the power feeding unit includes a resonance circuit, and the measuring unit measures a quality factor of the resonance circuit as the electric characteristic value.

(19) A control method of a power feeding apparatus, including: measuring an electric characteristic value of a power feeding unit configured to supply electric power to a power receiving apparatus through a magnetic field and generating a measurement value, the measuring and the generating being performed by a measuring unit; receiving a set value which is set in the power receiving apparatus, the receiving being performed by a receiving unit; and detecting the foreign substance based on the set value and the measurement value, the detecting being performed by a foreign substance detection unit.

(20) The control method of a power feeding apparatus according to (19), wherein the set value is set based on a quantity of conductors included in the power receiving apparatus.

(21) The control method of a power feeding apparatus according to (19) or (20), wherein the power feeding unit includes a resonance circuit, and the measuring unit measures, in the measuring, a quality factor of the resonance circuit as the electric characteristic value.

(22) A power feeding apparatus comprising: a power feeding unit configured to supply electric power to a power receiving apparatus through a magnetic field; a measuring unit configured to measure an electric characteristic value and to generate a measurement value; a power receiving unit configured to provide a set value; and a foreign substance detection unit configured to detect a foreign substance in the magnetic field based on the set value and the measurement value.

(23) The power feeding apparatus of (22), wherein at least the power receiving unit is configured to set the set value.

(24) The power feeding apparatus of (22), wherein the set value is a based on a quantity of conductors provided in the power receiving apparatus.

(25) The power feeding apparatus of (22), wherein the set value is based on a surface area of a conductor provided in the power receiving apparatus.

(26) The power feeding apparatus of (22), wherein the set value is based on change of the electric characteristic value due to an arrangement of the power receiving apparatus in the magnetic field.

(27) The power feeding apparatus of (22), wherein at least one of the power feeding unit and the measuring unit is configured to supply a plurality of test signals through the magnetic field based on a plurality of AC signals having different frequencies, and wherein the measuring unit is configured to measure the electric characteristic value at each time one of the plurality of test signals is supplied and to supply, to the foreign substance detection unit, the measurement value based on a statistic of the electric characteristic value.

(28) The power feeding apparatus of (22), wherein the power feeding unit includes a resonance circuit, and wherein the measuring unit is configured to measure the electric characteristic value based on at least one of a quality factor, an inductance, and a resonance frequency associated with the resonance circuit.

(29) The power feeding apparatus of (22), further comprising:
a power feeding control unit configured to control electric energy of AC power and to supply the controlled AC power as the electric power; and
a filter circuit inserted between the power feeding control unit and the power feeding unit.

(30) The power feeding apparatus of (22), wherein the measuring unit is configured to measure inductance of the power feeding unit as the electric characteristic value.

(31) The power feeding apparatus of (22), wherein the power feeding unit includes a power feeding coil configured to supply the electric power through the magnetic field, and the measuring unit includes a variable capacity connected to the power feeding coil.

(32) A power receiving apparatus comprising:
a power receiving unit configured to receive electric power supplied by a power feeding apparatus through a magnetic field; and
a transmitting unit configured to transmit, to the power feeding apparatus, a set value.

(33) The power receiving apparatus of (32), wherein at least the power receiving unit is configured to set the set value.

(34) The power receiving apparatus of (32), wherein the set value is based on a quantity of conductors provided in the power receiving apparatus.

(35) The power receiving apparatus of (32), wherein the set value is based on a surface area of a conductor provided in the power receiving apparatus.

(36) The power receiving apparatus of claim (32), wherein the set value is based a change of the electric characteristic value due to an arrangement of the power receiving apparatus in the magnetic field.

(37) A power feeding system comprising:
a power receiving apparatus including a power receiving unit configured to receive electric power through a magnetic field, and a transmitting unit configured to transmit a set value;
a power feeding apparatus including a power feeding unit configured to supply the electric power to the power receiving apparatus through the magnetic field, a measuring unit configured to measure an electric characteristic value and to generate a measurement value, and a foreign substance detection unit configured to detect a foreign substance in the magnetic field based on the set value and the measurement value.

(38) The power feeding system of (37), wherein at least the power receiving unit is configured to set the set value.

(39) The power feeding system of (37), wherein the power feeding unit includes a resonance circuit, and wherein the measuring unit is configured to measure the electric characteristic value based on at least one of a quality factor, an inductance, and a resonance frequency associated with the resonance circuit.

(40) A method of controlling power feeding comprising:
supplying electric power through a magnetic field from a power feeding apparatus to a power receiving apparatus;
measuring an electric characteristic value and generating a measurement value based on the electric characteristic value;
determining a set value; and
detecting a foreign substance in the magnetic field based on the set value and the measurement value.

REFERENCE SIGNS LIST 100 power feeding apparatus
110,410 resonance circuit
111, 113, 172, 411 capacitor
112 power feeding coil
120 power feeding control unit
121 switching control unit
122 switch unit
123, 124, 125, 126, 158, 159 transistor
130, 430 COMMUNICATION UNIT
140, 150, 155 measuring unit
141, 142 buffer circuit
143, 144 rectifying unit
145 A/D CONVERTER
146 Q factor acquisition unit
147 variable capacity
151 AC power source
152 variable capacity control unit
156 measurement control unit
157 test signal supplying unit
160 foreign substance detection unit
161 threshold table
162, 164 threshold acquisition unit
163 comparison unit
170 filter circuit
171, 173 inductor
400, 401 power receiving apparatus
412 power receiving coil
420 charging control unit
440 STORAGE UNIT
450 secondary cell

The invention claimed is:
1. A power transmitting device comprising:
a resonance circuit; and
circuitry configured to:
electronically perform a measurement on the resonance circuit to obtain a quality factor of the resonance circuit,
electrically obtain a threshold value based on a reference value received from a power receiving device after feeding first electric energy from the resonance circuit to the power receiving device,
electronically detect an absence of a foreign object in a magnetic field generated by the power transmitting device or a presence of the foreign object in the magnetic field by comparing the quality factor with the threshold value, and
electronically perform a transmission of second electric energy from the resonance circuit to the power receiving device in a case where the absence is detected, the second electric energy is larger than the first electric energy.

2. The power transmitting device according to claim 1, wherein the resonance circuit wirelessly emits the magnetic field.

3. The power transmitting device according to claim 1, wherein the circuitry performs the measurement when the power receiving device is on a surface of the power transmitting device.

4. The power transmitting device according to claim 1, wherein the circuitry detects the presence of the foreign object in the magnetic field when the quality factor is less than the threshold value.

5. The power transmitting device according to claim 1, wherein the circuitry detects the presence of the foreign object in the magnetic field when the quality factor is equal to the threshold value.

6. The power transmitting device according to claim 1, wherein the circuitry detects the absence of the foreign object in the magnetic field when the quality factor is not less than the threshold value.

7. The power transmitting device according to claim 1, wherein the threshold value is less than the reference value.

8. The power transmitting device according to claim 1, wherein the threshold value is calculated from the reference value.

9. A wireless power system comprising:
a power transmitting device that has a resonance circuit, the power transmitting device configured to perform a measurement on the resonance circuit to obtain a quality factor of the resonance circuit; and
a power receiving device configured to communicate a reference value to the power transmitting device after feeding first electric energy from the resonance circuit to the power receiving device,
wherein the power transmitting device is configured to obtain a threshold value based on the reference value, and configured to detect an absence of a foreign object in a magnetic field generated by the power transmitting device or a presence of the foreign object in the magnetic field by comparing the quality factor with the threshold value, and electronically perform a transmission of second electric energy from the resonance circuit to the power receiving device in a case where the absence is detected, the second electric energy is larger than the first electric energy.

10. The wireless power system according to claim 9, wherein the power transmitting device detects the absence of the foreign object in the magnetic field when the quality factor is not less than the threshold value.

11. The wireless power system according to claim 9, wherein the power transmitting device detects the presence of the foreign object in the magnetic field when the quality factor is less than the threshold value.

12. The wireless power system according to claim 9, wherein the power transmitting device is configured to inhibit a wireless transfer of electric power from the power transmitting device to the power receiving device when the quality factor is lower than the threshold value.

13. The wireless power system according to claim 9, wherein the power transmitting device is configured to inhibit a wireless transfer of electric power from the power transmitting device to the power receiving device when the quality factor is equal to the threshold value.

14. A power transmitting method for operating a power transmitting device that has a resonance circuit, the method comprising:
   performing a measurement on the resonance circuit to obtain a quality factor of the resonance circuit;
   receiving a reference value from a power receiving device after feeding first electric energy from the resonance circuit to the power receiving device;
   determining a threshold value based on the reference value;
   detecting an absence of a foreign object in a magnetic field generated by the power transmitting device or a presence of the foreign object in the magnetic field by comparing the quality factor with the threshold value; and
   electronically performing a transmission of second electric energy from the resonance circuit to the power receiving device in a case where the absence is detected, the second electric energy is larger than the first electric energy.

15. The power transmitting method according to claim 14, further comprising:
   terminating a wireless transfer of electric power from a power transmitting device to the power receiving device when the quality factor is lower than the threshold value.

16. The power transmitting method according to claim 14, further comprising:
   wirelessly transferring electric power from a power transmitting device to the power receiving device when the quality factor is not less than the threshold value.

17. The power transmitting method according to claim 14, wherein the measurement is performed before electric power is added to the magnetic field.

18. The power transmitting method according to claim 17, further comprising:
   terminating an addition of the electric power into the magnetic field after determining the presence of the foreign object in the magnetic field.

19. The power transmitting method according to claim 17, further comprising:
   adding the electric power to the magnetic field after determining the absence of the foreign object in the magnetic field.

\* \* \* \* \*